US008880090B2

(12) United States Patent
Tafreshi

(10) Patent No.: US 8,880,090 B2
(45) Date of Patent: *Nov. 4, 2014

(54) ACTIVE SET MODIFICATION TO RELEASE BACKHAUL CAPACITY

(75) Inventor: Fereidoun Tafreshi, Redmond, WA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 283 days.

This patent is subject to a terminal disclaimer.

(21) Appl. No.: 13/560,251

(22) Filed: Jul. 27, 2012

(65) Prior Publication Data
US 2012/0294179 A1 Nov. 22, 2012

Related U.S. Application Data

(63) Continuation of application No. 12/646,367, filed on Dec. 23, 2009, now Pat. No. 8,254,949.

(51) Int. Cl.
*H04W 72/00* (2009.01)
*H04W 36/18* (2009.01)
*H04W 76/06* (2009.01)

(52) U.S. Cl.
CPC ............ *H04W 36/18* (2013.01); *H04W 76/064* (2013.01)
USPC ........... 455/453; 455/450; 455/451; 455/464; 455/509; 370/329; 370/330; 370/341; 370/331; 370/436

(58) Field of Classification Search
USPC ......... 455/453, 450–451, 464, 509, 436–442, 455/452.1–452.2
See application file for complete search history.

(56) References Cited

U.S. PATENT DOCUMENTS

| 8,711,768 | B2 * | 4/2014 | Viswanath | .................... 370/328 |
| 2007/0177510 | A1 | 8/2007 | Natarajan et al. | |
| 2008/0248807 | A1 * | 10/2008 | Kim et al. | ..................... 455/453 |
| 2009/0093243 | A1 | 4/2009 | Lee et al. | |

OTHER PUBLICATIONS

Office Action dated Dec. 1, 2011 for U.S. Appl. No. 12/646,367, 22 pages.

* cited by examiner

*Primary Examiner* — Wayne Cai
(74) *Attorney, Agent, or Firm* — Amin, Turocy & Watson, LLP

(57) ABSTRACT

System(s), method(s), and device(s) that enable release of backhaul capacity associated with base stations are presented. During soft handover, a communication device can have its connection maintained with more than one base station. A link controller component can identify a radio link having the highest quality and can determine the relative backhaul load of each base station communicating with the communication device. The link controller component determines whether the base station having the highest radio link quality is experiencing the heaviest backhaul load relative to the other base stations. If the base station with the highest link quality does not also have the heaviest backhaul load, the link controller component identifies the base station having the heaviest backhaul load and the identified base station can have its status modified with respect to the communication device for a desired period of time, in accordance with predefined status modification criteria.

20 Claims, 8 Drawing Sheets

ACTIVE SET MODIFICATION TO RELEASE BACKHAUL CAPACITY

RELATED APPLICATION

The subject application is a continuation of U.S. patent application Ser. No. 12/646,367, filed Dec. 23, 2009, and entitled "ACTIVE SET MODIFICATION TO RELEASE BACKHAUL CAPACITY", the entirety of which is incorporated by reference herein.

TECHNICAL FIELD

The subject innovation generally relates to wireless communications, and, more particularly, to modification of an active set to release backhaul capacity.

BACKGROUND

Conventionally, certain types of wireless technologies, such as Code Division Multiple Access (CDMA) systems and Wideband CDMA (WCDMA) systems, allow for soft handover of a communication device (e.g., mobile phone, computer, etc.) from one base station to another base station. Typically, during soft handover, the communication device can be communicating (e.g., transmitting, receiving) data concurrently with two or more base stations. Base stations or cells with which the communication device is communicating during soft handover can be part of an active set associated with the communication device. There also can be instances during soft handover where one or more base stations or cells are not actively communicating data with the communication device, but the communication device can be monitoring or "listening" to such base station(s) to determine respective radio link quality with respective base stations and decoding their signals, where the one or more base stations not actively communicating can be included in a monitored set associated with the communication device. For example, a base station that does not satisfy the qualifications (e.g., desired radio link quality with the communication device) to be part of an active set associated with a communication device but is defined as a neighbor of the communication device, can be made part of a monitored set (also referred to as monitored neighbor set) associated with the communication device. An advantage of soft handover with the communication device concurrently communicating with more than one base station is diversity and improved data transmission associated with the communication device, as compared to when the communication device is only communicating with one base station. However, there is a cost to the network with having redundancy of data transmission when using diversity, as the overall load on the Radio Network Controller (RNC) is increased (and available backhaul capacity decreased) due in part the redundant transmissions to several base stations resulting from employing soft handover.

Typically, the base stations also can be communicating with other communication devices in the network. As a result, if the number of communication devices communicating with a particular base station is relatively high and/or the types of communication engaged in by those communication devices is relatively data intense (e.g., multimedia download, movie download, etc.), the load on the particular base station or the load on the interface between the base station and RNC can be relatively high compared to other nearby base stations. There can be instances during soft handover where the communication device has a strong communication link with one base station, but communication with the communication device is being supplemented by one or more base stations on the active set associated with the communication device, where one (or more than one) of those one or more base stations is experiencing a relatively heavy backhaul load (e.g. Iub capacity) as compared to the best communicating base station(s) (e.g., best communicating base station is the one with highest quality on its Ec/Io, where Ec is carrier power and Io is total interference). It is desirable to be able to reduce the backhaul load (e.g. Iub capacity) on such base station(s) experiencing a heavy load, while still maintaining a strong radio link with the communication device.

SUMMARY

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The subject innovation provides systems, methods, and devices that can modify status of a desired base station with respect to a communication device during soft handover to facilitate releasing backhaul capacity (e.g. Iub capacity) are presented. In an aspect, during soft handover of a communication device, the communication device can have its connection maintained with more than one base station. A link controller component can determine quality of the radio link and relative backhaul load (e.g., Iub load) of each base station associated with (e.g., actively communicating with) the communication device. The link controller component can determine whether the strongest radio link (e.g., highest radio link quality) associated with the communication device meets or exceeds a predefined minimum acceptable link quality threshold level. If the strongest radio link does not meet or exceed the predefined minimum acceptable link quality threshold level, the link controller component can determine that status of a base station associated with the communication device is not to be modified.

If the strongest radio link does meet or exceed the predefined minimum acceptable link quality threshold level, the link controller component can determine whether the base station having the highest radio link quality also is experiencing the heaviest backhaul load (e.g., Iub load), with regard to its link (e.g., Iub link) with a network controller (e.g., Radio Network Controller), relative to the other base stations communicating with the same communication device. If the base station with the highest radio link quality does not have the heaviest backhaul load, and/or other predefined status modification criteria are met, the link controller component can identify the base station having the heaviest backhaul load (e.g., Iub load) and the status of that base station can be modified, for a desired period of time. For example, the status of such base station with respect to the communication device can be modified so such base station ceases data transmission with the communication device, transitions from an active set to a monitored set associated with the communication device, or is dynamically redefined so that the radio link between the communication device and that base station is removed and a neighbor cell list associated with the communication device is updated to remove that base station from the neighbor cell list.

In accordance with various other aspects and embodiments, the subject innovation can dynamically re-evaluate a status modification of a base station in response to a predefined status modification condition being met (e.g., meeting the predefined status modification condition can dynamically trigger re-evaluation of the status modification of the base station); and/or the subject innovation can monitor and evaluate fluctuations or volatility in communication conditions associated with the communication device and/or in backhaul load levels of base stations associated with the communication device to facilitate determining whether status modification of an associated base station in relation to the communication device is to occur, in accordance with the predefined status modification criteria.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

DETAILED DESCRIPTION

Figure 1:
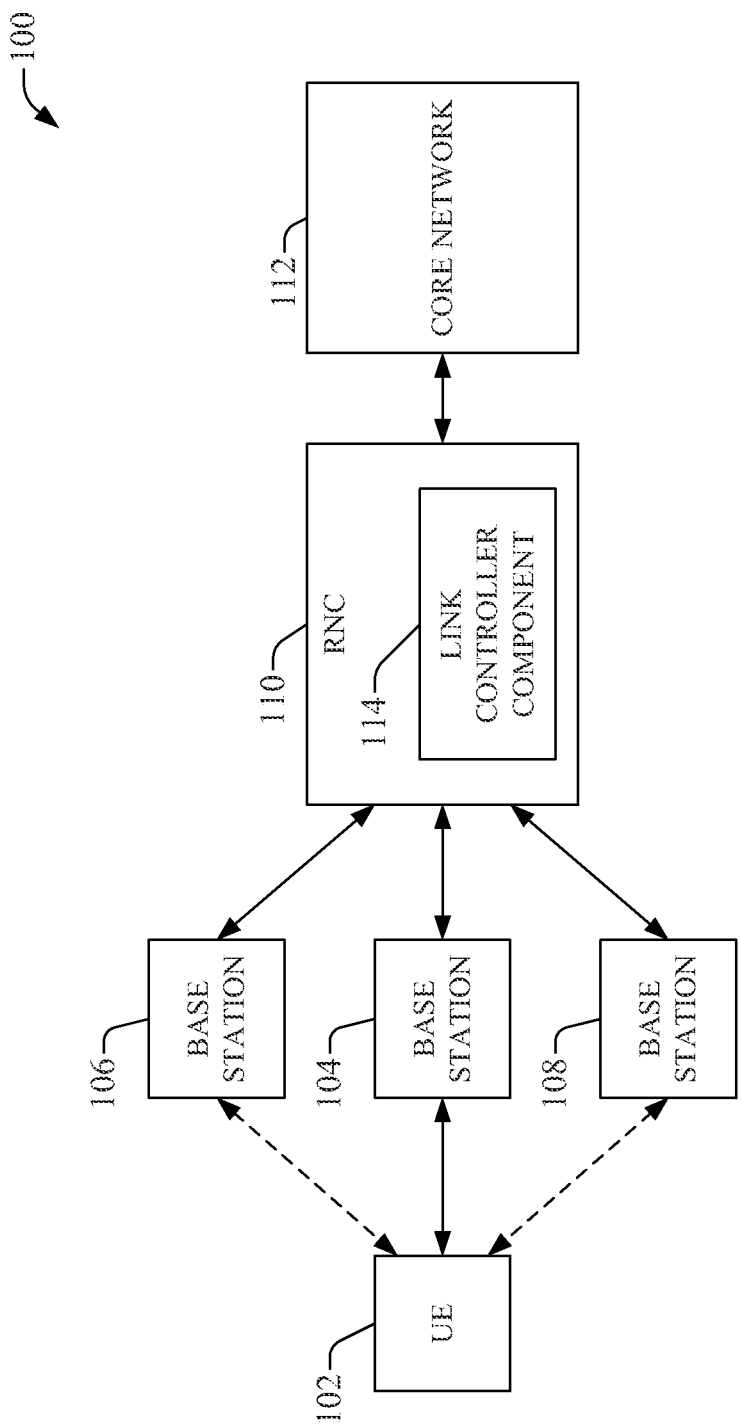
FIG. 1 is a block diagram of an example system that can control status of base stations with respect to a communication device during soft handover to facilitate releasing backhaul capacity in accordance with various aspects and embodiments of the disclosed subject matter.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment," "mobile station," "mobile," "subscriber station," "communication device," "access terminal," "terminal," "handset," and similar terminology, refer to a wireless device (e.g., cellular phone, smart phone, computer, personal digital assistant (PDA), set-top box, Internet Protocol Television (IPTV), electronic gaming device, multi-media recorder/player, video recorder/player, audio recorder/player, printer, etc.) utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point," "base station," "Node B," "evolved Node B," "home Node B (HNB)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," and the like are employed interchangeably throughout the subject specification, unless context warrants particular distinction(s) among the terms.

The following abbreviations are relevant to the subject specification.
3G Third Generation
3GPP Third Generation Partnership Project
AGPS Assisted GPS
AP Access Point ADSL Asymmetric Digital Subscriber Line
AWS Advanced Wireless Services
BRAS Broadband Remote Access Server
BTA Basic Trading Area
CDMA Code Division Multiple Access
CN Core Network
CS Circuit-Switched
CSCF Call Session Control Function
CPE Customer Premise Equipment
CPN Customer Premise Network
DHCP Dynamic Host Configuration Protocol
DSL Digital Subscriber Line
DSLAM Digital Subscriber Line Access Multiplexer
E911 Enhanced 911
FCC Federal Communications Commission
FL Forward Link
GGSN Gateway GPRS Service Node
GPRS General Packet Radio Service
GPS Global Positioning System
GW Gateway
HAP Home Access Point
HSS Home Subscriber Server
ISDN Integrated Services Digital Network
UE User Equipment
UTRAN Universal Terrestrial Radio Access Network
IMS IP Multimedia Subsystem
IP Internet Protocol
ISP Internet Service Provider
MSA Metropolitan Statistical Areas
MSISDN Mobile Subscriber ISDN Number
MTA Major Trading Areas
NAT Network Address Translation
NTP Network Time Protocol
O&M Operation and Maintenance
PC Personal Computer
PCS Personal Communications Service
PS Packet-Switched
PSTN Public Switched Telephone Network
RAN Radio Access Network
RBS Radio Base Station
RL Reverse Link
RNC Radio Network Controller
RSA Rural Service Area
SGSN Serving GPRS Support Node
SIP Session Initiation Protocol
USSD Unstructured Supplementary Service Data
VPN Virtual Private Network
WAP Wireless Application Protocol
WCDMA Wideband CDMA
XDSL Asynchronous-DSL or Synchronous-DSL Referring to the drawings, FIG. 1 is a block diagram of an example system 100 that can control status of base stations with respect to a communication device (e.g., user equipment (UE)) during soft handover to facilitate releasing backhaul capacity in accordance with various aspects and embodiments of the disclosed subject matter. In an aspect, example system 100 can include a desired number of UEs (e.g., mobile and/or wireless communication device, such as a mobile phone (e.g., 3GPP UMTS phone), personal digital assistant (PDA), computer, IP television (IPTV), gaming console, set-top box, multi-media recorder/player, video recorder/player, audio recorder/player, printer, etc.), including UE 102 in a communication network environment. The UE 102 can be located in a wireless portion (e.g., region) of the communication network, for example, the UE 102 can be connected (e.g., wirelessly connected) to a base station 104 that can serve a specified coverage area to facilitate communication by the UE 102 and other UEs (not shown) in the wireless communication environment. The base station 104 can serve a respective coverage macro cell that can cover a specified area, and the base station 104 can service mobile wireless devices, such as UE 102, located in the respective area covered by the macro cell, where such coverage can be achieved via a wireless link (e.g., uplink (UL), downlink (DL)). When an attachment attempt is successful, the UE 102 can be served by the base station 104 and incoming voice and data traffic can be paged and routed to the UE 102 through the base station 104, and outgoing voice and data traffic from the UE 102 can be paged and routed through the base station 104 to other communication devices (e.g., another UE). In an aspect, the UE 102 can be connected and can communicate wirelessly using virtually any desired wireless technology, including, for example, cellular, Wi-Fi, Wi-Max, wireless local area networks (WLAN), etc.

In an aspect, the UE 102 can be in a state of soft handover, where, in addition to being linked with, served by, and communicating with the base station 104, the UE 102 also can have a radio link and be in communication (e.g., reception, transmission) with one or more other base stations, such as base stations 106 and 108. The base stations 106 and 108 each can serve a respective coverage macro cell that can cover a specified area, and the base stations 106 and 108 can service mobile wireless devices (e.g., UEs) located in the respective areas covered by the respective macro cells, where such coverage can be achieved via a wireless link (e.g., UL, DL), where, for example, the respective coverage areas of the base stations 104, 106, and/or 108 can overlap such that more than one of those base stations can have a communication link (e.g., radio link) and can communicate with the UE 102. For instance, during soft handover, the base stations 106 and/or 108 can redundantly transmit the same data to the UE 102 as the data being transmitted to the UE 102 by the base station 104, where the redundant transmissions can provide diversity and improved reception of data by the UE 102. During soft handover, when base stations, such as base station 104, base station 106 and/or base station 108, are actively communicating with the UE 102, such base station(s) can be part of an active set associated with the UE 102.

In another aspect, each of the base stations 104, 106 and 108 can be associated with an RNC 110 that can control base stations, including base station 104, 106, and 108, which are connected to the RNC 110 via respective backhaul links (e.g., respective Iub links). The RNC 110 can manage (e.g., control) radio channels associated with the base stations connected thereto and can facilitate load control (e.g., backhaul load control) for associated base stations and the radio network subsystem (RNS), packet scheduling for UEs (e.g., 102) associated with the base stations, handover (e.g., soft handover, hard handover) of UEs, macrodiversity combining, security functions associated with the RNS, resource optimization (e.g., dynamic radio bearer control, adaptive multi-rate control, etc.) associated with communications associated with UEs, etc.

In still another aspect, the RNC 110 can be associated with a core network 112 that can facilitate wireless communication of voice and data associated with communication devices, such as UE 102, in the communication network. The core network 112 can facilitate routing voice and data communications between a communication device(s), such as UE 102, and other communication devices (e.g., phone, computer, email server, multimedia server, audio server, video server, news server, financial or stock information server, other communication devices associated with the Internet (not shown), etc.) (not shown) associated with the core network 112 in the communication network. The core network 112 also can allocate resources to the UEs 102 in the network, convert or enforce protocols, establish and enforce Quality of Service (QoS) for the UEs 102, provide applications or services in the network, translate signals, and/or perform other desired functions to facilitate system interoperability and communication in the wireless communication network. The core network 112 further can include desired components, such as routers, nodes, switches, interfaces, controllers, etc., that can facilitate communication of data between communication devices in the communication network.

Conventionally, while more than one base station is linked with a UE during soft handover and part of the active set associated with the UE, the base stations also can be communicating with other communication devices in the communication network. As a result, if the number of communication devices communicating with a particular base station is relatively high and/or the types of communication engaged in by those communication devices is relatively data intense (e.g., multimedia download, movie download, etc.), the backhaul load on the particular base station (e.g., the Iub load on the Iub link between the particular base station and the RNC) can be relatively high compared to other base stations that are also linked with the UE (and RNC) and associated with the active set of the UE. Further, there can be instances during soft handover where the UE has a strong radio link with one of the base stations on its active set, but communication with the UE is being supplemented by one or more base stations on the active set of the UE, where one (or more than one) of those one or more base stations is experiencing a relatively heavy backhaul load as compared to other base stations on the active set associated with the UE. It is desirable to be able to reduce the backhaul load (e.g. Iub load) on such base station(s) experiencing a heavy backhaul load, while still maintaining a strong radio link (e.g., high radio link quality) and desired quality of communication with the communication device.

In contrast to conventional systems and techniques, the subject innovation can control (e.g., modify, adjust) status (e.g., communication status, active set status, link status, etc.) of a base station(s) associated with the UE 102 (e.g., base station(s) that is part of the active set associated with the UE 102) while the UE 102 is in a state of soft handover to facilitate releasing or maintaining desired backhaul capacity (e.g., Iub capacity) associated with a relatively heavily backhaul-loaded base station(s) and still maintaining a desired quality of communication with the UE 102.

In an aspect, the RNC 110 can comprise a link controller component 114 that can control status of a base station(s) (e.g., 106, 108) associated with the UE 102 while in soft handover based at least in part on predefined status modification criteria (e.g., radio link quality of base station having the highest radio link quality with the UE 102 meeting or exceeding a predefined minimum acceptable link quality threshold level, which can be one predefined status modification condition; the base station, which is part of the active set of the UE 102, that has the heaviest backhaul load relative to other base station(s) on the active set associated with the UE 102 also is not the base station with the highest radio link quality with the UE 102—which can be another predefined status modification condition; etc.).

In an aspect, the link controller component 114 can control status of communication, active set, and/or a radio link of a base station(s) (e.g., 106, 108) associated with the UE 102 while in soft handover in accordance with the predefined status modification criteria. For instance, the link controller component 114 can control the base stations 104, 106, and/or 108 associated with the UE 102 to have the base station having the heaviest backhaul load (when such base station is not the one with the highest radio link quality with the UE 102) (1) cease or discontinue transmitting data (e.g., data such as multimedia data, video data, audio data, messaging data, etc.; data relating to Voice over IP (VoIP); voice communication, etc.) to the UE 102 for a predefined period of time or until a predefined status modification condition is met, while remaining part of the active set associated with the UE 102; (2) transition from the active set to a monitored set (also referred to as a monitored neighbor set) associated with the UE 102 for a predefined period of time or until a predefined status modification condition is met; or (3) be dynamically redefined in the neighbor cell list communicated to the UE 102 such that such base station is removed from the neighbor cell list and the radio link between that base station and the UE 102 is removed for a predefined period of time or until a predefined status modification condition is met—in accordance with the predefined status modification criteria. In accordance with various embodiments, as desired, the system 100 can be implemented such that one of the above status modifications is employed when a predefined status modification condition(s) is met, although, as desired, the system 100 can be implemented such that more than one of the above status modification are available to be employed when a predefined status modification condition(s) is met.

In an aspect, the link controller component 114 of the RNC 110 can periodically or continually monitor and measure the respective amounts of backhaul load (e.g., Iub load) on the respective base stations 104, 106 and/or 108. In accordance with one embodiment, the link controller component 114 also can receive respective messages (e.g., event messages) from the UE 102, for example, when the UE 102 determines that the base station, which had the highest radio link quality, no longer has the highest radio link quality, where the link controller component 114 can use such received event messages to facilitate controlling status modifications with respect to base stations, such as the base stations 104, 106, and/or 108. For example, a first type of event message can indicate that a base station, which had the highest radio link quality (and is part of the active set associated with the UE 102), no longer has the highest radio link quality, and another base station, which is part of the active set associated with the UE 102, now has the highest radio link quality with respect to the UE 102; a second type of message can indicate that the base station, which had the highest radio link quality (and is part of the active set associated with the UE 102), no longer has the highest radio link quality, and another base station, which is not part of the active set associated with the UE 102 (e.g., another base station, which is part of the monitored set associated with the UE 102), now has the highest radio link quality with respect to the UE 102.

In accordance with another embodiment, the link controller component 114 can monitor and receive information relating to the respective radio link quality of the respective base stations 104, 106, and/or 108 with respect to the UE 102. For example, the link controller component 114 can receive messages from the UE 102 indicating respective radio link quality values or levels respectively associated with base stations associated with the UE 102 (e.g., base stations that are on the neighbor cell list associated with the UE 102).

In another aspect, the link controller component 114 can analyze and evaluate the information relating to radio link quality (e.g., event message(s) or measured radio link quality) associated with the UE, and also can analyze and evaluate information relating to respective backhaul load amounts of the respective base stations 104, 106, and/or 108, to facilitate controlling status modifications with respect to base stations, such as the base stations 104, 106, and/or 108. The link controller component 114 can identify the radio link, and base station (e.g., 104) associated with such link, having the highest radio link quality as compared to the radio link quality of the other base stations (e.g., 106 and/or 108) that are part of the active set associated with the UE 102. In still another aspect, the link controller component 114 can evaluate the highest radio link quality to determine whether the radio link quality meets or exceeds a predefined minimum acceptable link quality threshold level in accordance with the predefined status modification criteria, where one status modification criteria can be that the base station (e.g., 104) having the highest radio link quality with the UE 102 have a radio link quality that meets or exceeds the predefined minimum acceptable link quality threshold level.

For example, in accordance with one embodiment, to facilitate identifying the radio link (and associated base station) having the highest radio link quality with respect to the UE 102, the link controller component 114 can, for a given time period, evaluate an event message(s), if any, received from the UE 102, where a particular event message can, for example, indicate that there has been a change in the radio link having the highest radio link quality (e.g., a different radio link between the UE 102 and a different base station now has the highest radio link quality). If no event message is received, the link controller component 114 can determine or infer that the same radio link that had the highest radio link quality continues to have the highest radio link quality; if an event message is received, depending in part on the type of event message, the link controller component 114 can determine that another radio link between the UE and another associated base station that is part of the active set now has the highest radio link quality, or determine that another radio link between the UE and a disparate associated base station that is not part of the active set (e.g., is part of the monitored set) now has the highest radio link quality associated with the UE.

In an aspect, the link controller component 114 also can evaluate the stability of the active set of the UE (e.g., how frequently or infrequently the active set changes for the UE), the frequency of receiving event messages from the UE, the types of event messages received from the UE, etc., over a desired (e.g., predefined) time period to facilitate determining or inferring a radio link quality value for the radio link identified as having the highest radio link quality at a given evaluation time, in accordance with the predefined status modification criteria. For example, a relatively stable active set (e.g., relatively little or no change as to which radio link has the highest quality, and/or relatively little or no change in the base stations that are part of the active set, etc.) associated with the UE for a given period of time (e.g., the predefined period of time) can indicate to the link controller component 114 that the radio link having the highest radio link quality is at least a certain value such that the highest radio link quality value at least meets the predefined minimum acceptable link quality threshold level or value. As another example, a relatively unstable active set (e.g., relatively significant amount of change regarding which radio link has the highest quality, and/or relatively significant amount of change regarding which base stations are part of the active set, etc.) associated with the UE 102 for a given period of time can indicate to the link controller component 114 that the radio link currently having the highest quality does not have a radio link quality value that at least meets the predefined minimum acceptable link quality threshold level.

In accordance with another embodiment, the RNC 110 (and link controller component 114) can receive radio link quality measurements of respective radio links between the UE 102 and associated base stations (e.g., 104, 106, and/or 108) from the UE 102. The link controller component 114 can evaluate the received radio link quality measurements to determine or identify which radio link has the highest radio link quality, and evaluate the radio link having the highest radio link quality to determine whether that radio link at least meets the predefined minimum acceptable link quality threshold level.

In another aspect, in addition to any other action taken, such as with regard to status modification relating to a base station, as disclosed herein, the RNC 110 (and/or link controller component 114) can respond to received information relating to communication conditions (e.g., event message indicating a change in the radio link having the highest radio link quality; radio link quality measurements indicating a change in the radio link having the highest radio link quality) by sending a respective signal or message (e.g., a specified event message) to have the base station that has the radio link having the highest quality be the primary serving base station to the UE 102, have one or more base stations change from active set to monitored set (or change from monitored set to active set) associated with the UE 102, take another desired action, or make no changes with regard to the active set or monitored set of the UE 102, based at least in part on the communications conditions information (e.g., the type(s) of event message(s); radio link quality measurements) received by the RNC 110 and/or link controller component 114.

In still another aspect, if the link controller component 114 determines that the highest radio link quality does not meet or exceed the predefined minimum acceptable link quality threshold level, the link controller component 114 can determine that no action is to be taken regarding the status of the base stations 104, 106, and 108 (e.g., no change in communication status, active set status, or link status associated with the base stations), and the link controller component 114 can continue to monitor conditions (e.g., radio link quality, backhaul load level, etc.) relating to the UE 102 and base stations 104, 106, and/or 108. If the link controller component 114 determines the highest radio link quality does meet or exceed the predefined minimum acceptable link quality threshold level, the link controller component 114 can evaluate the respective backhaul load amounts towards the base stations 104, 106 and/or 108 to determine which of the base stations that are part of the active set associated with the UE 102 has the heaviest backhaul load relative to the other base stations that are part of the active set associated with the UE 102. After identifying the base station having the heaviest backhaul load, the link controller component 114 can determine whether the base station having the heaviest backhaul load is also the base station having the highest link quality with the UE 102, where another status modification condition can specify that there is no status modification (e.g., active status modification) for a base station(s) associated with the UE 102 when the base station having the highest radio link quality with respective the UE 102 is also the base station having the heaviest backhaul load relative to the other base stations associated with the UE 102 (e.g., base stations that are part of the active set associated with the UE 102).

If the link controller component 114 determines that the base station (e.g., 104) having the heaviest backhaul load is also the base station (e.g., 104) having the highest radio link quality with the UE 102, the link controller component 114 can determine that no action is to be taken regarding the status of the base stations 104, 106, and 108 at this time, and the link controller component 114 can continue to monitor conditions relating to the UE 102 and base stations 104, 106, and/or 108. If the link controller component 114 determines that the base station (e.g., 108) having the heaviest backhaul load is not the same as the base station (e.g., 104) having the highest radio link quality with the UE 102, the link controller component 114 can determine that the status of the one or more of the base stations that are part of the active set associated with the UE 102 is/are to be modified (e.g., adjusted) in accordance with the predefined status modification criteria.

For example, in accordance with the predefined status modification criteria, the link controller component 114 can determine that the status of the base station (e.g., 108) having the heaviest backhaul load relative to the other base stations associated with the UE 102, and not having the highest radio link quality with the UE 102, is to be modified such that the base station can: (1) automatically or dynamically cease or discontinue transmitting data to the UE 102 for a predefined period of time or until a predefined status modification condition is met, while remaining part of the active set associated with the UE 102 (e.g., the link controller component 114 can modify distribution of data to the UE 102 such that the base station (e.g., 108) having the heaviest backhaul load level (and not having the highest radio link quality with the UE 102), will not receive data from the RNC 110 to forward to the UE 102 for a desired amount of time); (2) be automatically or dynamically transitioned from the active set to the monitored set associated with the UE 102 for a predefined period of time or until a predefined status modification condition is met (as well as discontinuing data transmission to the UE 102); or (3) be automatically or dynamically redefined such that the radio link between that base station and the UE 102 is removed, and the neighbor cell list of the UE 102 updated to remove that base station from the neighbor cell list, for a predefined period of time or until a predefined status modification condition is met (as well as discontinuing data transmission to the UE 102 and initially transitioning from the active set to the monitored set associated with the UE 102 during the process of removing the radio link).

In an aspect, to facilitate causing a desired base station to cease data transmissions to the UE 102, the link controller component 114 can modify distribution of data to the UE 102 such that a base station (e.g., 108), which has the heaviest backhaul load level (and not having the highest radio link quality with the UE 102), will not receive data from the RNC 110 to forward to the UE 102 for a desired amount of time. In accordance with another aspect, the link controller component 114 can transmit a control signal to the UE 102 to facilitate modifying the status of the desired base station (e.g., 108), which has the heaviest backhaul load level (and does not have the highest radio link quality with the UE 102), with respect to the UE 102 for a desired amount of time (e.g., predefined period of time, until a predefined status modification condition is met). For instance, there can be a control signal to have the UE 102 transition the desired base station from the active set to the monitored set with respect to the UE 102 for a desired amount of time; or a control signal(s) to the UE 102 to direct the UE 102 to dynamically redefine the desired base station to remove or discontinue the radio link between the UE 102 and the desired base station for a desired amount of time and to have the UE 102 update its neighbor cell list to delete the desired base station from its neighbor cell list for the desired amount of time (and/or have the base station transitioned from the active set to the monitored set and then removed from the monitored set; or have the base station removed from the active set, without first transitioning to the monitored set—as desired). There also can be other control signals that can, for example, discontinue a status modification of a base station with respect to the UE 102 so that the base station returns to its prior status when a pre-defined status modification condition is met, where, for example, such condition can be that the level of the highest radio link quality has decreased below the applicable predefined minimum acceptable link threshold quality level, the quality of the radio link of the base station whose status was previously modified (such that it was moved to the monitored set) increases such that it is now the radio link with highest quality with respect to the UE 102 (e.g., the UE 102 can transmit a particular type of event message, which indicates that a base station on the monitored set now has the highest radio link quality, to the link controller component 114), the backhaul load of another base station that is part of the active set associated with the UE 102 has increased so that it is at or above a predefined maximum acceptable backhaul load threshold level, the relative backhaul load level of the base station having the highest radio link quality has increased so that it has the heaviest backhaul load level relative to other base stations that are part of the active set associated with the UE 102, and/or other conditions, as desired.

In accordance with still another aspect, the link controller component 114 can monitor and evaluate fluctuations or volatility in communication conditions (e.g., quality of radio link) associated with the UE 102 and/or fluctuations or volatility in backhaul load levels of base stations associated with the UE 102 in determining whether to perform a status modification with respect to a base station. For example, if there is at least a predefined amount of fluctuation or volatility in communication conditions associated with the UE 102 over a pre-defined period of time and/or at least a predefined amount of fluctuation or volatility in backhaul load levels of base stations associated with the UE 102 over a specified period of time (e.g., due to movement of the UE 102 in the network and/or movement of the UE 102 to an area, such as into or near a building or other structure, where quality of communication can fluctuate), the link controller component 114 can determine that status modification with respect to a base station is not to be performed (e.g., even if other criteria for status modification are met) due in part to the amount of change in communication conditions or backhaul load levels, in accordance with the predefined status modification criteria. In an aspect, the predefined period of time can be the same as or different than the specified period of time, as desired.

As an example of status modification, base stations 104, 106 and 108 can be communicating (e.g., transmitting data, receiving data) with the UE 102 and can be part of the active set associated with the UE 102. At a given evaluation time, the link controller component 114 can determine that the radio link between the base station 104 and UE 102 is the radio link with highest quality (illustrated in FIG. 1 as a solid line), as compared to the respective radio link qualities of the respective radio links of base stations 106 and 108 with the UE 102 (illustrated in FIG. 1 as dotted lines to denote that these radio links are not the links having the highest radio link quality with respect to the UE 102), based at least in part on received communications conditions information (e.g., event message(s); or radio link quality measurements). The link controller component 114 also can determine that the base station 108 has the heaviest backhaul load level relative to the other base stations 104 and 106, and can determine that the base station 104 has the second heaviest backhaul load level and the base station 106 has the third heaviest backhaul load level. The link controller component 114 can recognize that the base station 104 has the highest radio link quality with the UE 102, and, in accordance with the techniques disclosed herein, can determine or infer a radio link quality value of the radio link between the UE 102 and base station 104 to facilitate determining whether the highest radio link quality meets or exceeds the predefined minimum acceptable link quality threshold level. In this example, the link controller component 114 can determine that the highest radio quality exceeds the predefined minimum acceptable link quality threshold level. The link controller component 114 also can recognize that the base station 108 has the heaviest backhaul load level relative to the other base stations 104 and 106 that are part of the active set associated with the UE 102, and thus, can determine that the base station 104 has the highest radio link quality but does not have the heaviest backhaul load level. Based at least in part on this evaluation, the link controller component 114 can determine that the base station 108, which has the heaviest backhaul load level, can have its status modified in accordance with the predefined status modification criteria. The link controller component 114 can modify data distribution associated with the UE 102 such that the RNC 110 will cease sending data associated with the UE 102 to the base station 108 for a desired amount of time and/or send a desired control signal to the UE 102 to have the status of the base station 108 modified accordingly with respect to the UE 102 (e.g., the base station 108 can be transitioned from active set to monitored set with respect to the UE 102 for a desired amount of time, the base station 108 can be dynamically redefined to have its radio link with the UE 102 removed and can be removed from the neighbor cell list of the UE 102 for a desired amount of time, etc.), wherein the UE 102 can receive a control signal(s) or control message(s) and the status of the base station 108 can be modified with respect to the UE 102 in response to the control signal(s) or control message(s). As a result, for a desired amount of time, the base stations 104 and 106 will continue to communicate with the UE 102, but the base station 108 will not communicate with the UE 102, and/or may have its status further modified in relation to its active set status and/or radio link status with respect to the UE 102, in accordance with the desired status modification, thereby releasing backhaul capacity associated with the base station 108, where the backhaul capacity can be utilized for other desired purposes. Data communication with the UE 102 can still be desirably maintained due to the strength of the radio link with the base station 104 and buttressed by the diversity in data communication with the UE 102 facilitated by the base station 106.

It is to be appreciated and understood that while the above example and the description of FIG. 1 is described with regard to three base stations associated with the UE 102, the subject innovation is not so limited, as there can be less than three base stations, three base stations, or more than three base stations associated with the UE 102 in accordance with the subject innovation. For instance, there can be two base stations that are part of the active set associated with the UE 102 during soft handover. As desired, if the highest radio link quality between one of those base stations and the UE 102 meets a predefined minimum acceptable link quality threshold level and the other base station has the heaviest backhaul load level relative the base station with the highest radio link quality, the link controller component 114 can determine that the base station having the heaviest backhaul load level can have its status modified with respect to the UE 102 for a desired amount of time, in accordance with the predefined status modification criteria. As desired, the predefined minimum acceptable link quality threshold level for the highest radio link quality can be varied based at least in part on the number of base stations that are part of the active set associated with the UE 102 and/or the number of base stations that will remain part of the active set associated with the UE 102 if there is a status modification for a base station(s) with respect to the UE 102.

As an example when there are more than three base stations that are part of the active set associated with the UE 102 during soft handover, as desired, if the highest radio link quality between one of those base stations and the UE 102 meets a predefined minimum acceptable link quality threshold level and that base station does not have the heaviest backhaul load level relative to the base stations that are part of the active set, one or more of the other base stations having relatively heavier backhaul load level(s) as compared to the base station with the highest radio link quality (and any other base stations that are part of the active set), the link controller component 114 can determine that one or more of the base stations having the relatively heavier backhaul load level(s) can have its/their status modified with respect to the UE 102 for a desired amount of time, in accordance with the predefined status modification criteria (e.g., as desired, if there are four base stations that are part of the active set associated with the UE 102, the base station having the heaviest backhaul load level can have its status modified with respect to the UE 102, or the two base stations having the relatively heavier backhaul load levels (e.g., the base station having the heaviest backhaul load level and another base station having the next heaviest backhaul load level), as compared to the other base stations, can have their status modified with respect to the UE 102; if there are five base stations that are part of the active set associated with the UE 102, the base station having the heaviest backhaul load level can have its status modified with respect to the UE 102, or two or three of the base stations having relatively heavier backhaul load levels, as compared to the other base stations, can have their status modified with respect to the UE 102; . . . ).

It is to be appreciated and understood that, in accordance with various aspects, as desired, in accordance with the predefined status modification criteria, the link controller component 114 can re-evaluate and modify status of a base station(s) associated with the UE 102 (or formerly associated with the UE 102, for example, where the radio link with the UE 102 has been removed) based at least in part on a change in the number of base stations associated with the UE 102 (e.g., when another base station (not previously associated with the UE 102 during the last evaluation relating to status modification) is added to the active set associated with the UE 102 or when a base station is removed from the active set associated with the UE 102 (e.g., where such base station was removed for a reason other than status modification in accordance with the predefined status modification criteria)). For instance, if a base station is added to the active set associated with the UE 102, and that added base station has a higher radio link quality with the UE 102 than another base station, which, until the add, had the highest radio link quality with the UE 102, such event can trigger a re-evaluation by the link controller component 114 to determine whether status of a base station associated with the UE 102 is to occur.

In an aspect, the predefined status modification criteria can relate to, for example, the radio link quality of the radio link between a base station and the UE 102 that has the highest radio link quality (e.g., whether the highest radio link quality at least meets a predefined minimum acceptable link quality threshold level), respective backhaul load levels of the base stations associated with the UE 102 (e.g., whether a base station, associated with the UE 102 and other than the base station having the highest radio link quality, has the heaviest backhaul load level), the number of base stations associated with soft handover of the UE 102, type of status modification (e.g., modifying status of a base station to cease data transmission to the UE 102 by that base station, modifying status of a base station to transition that base station from an active set to a monitored set associated with the UE 102, modifying status of a base station to remove the radio link between the base station and the UE 102 and remove the base station from the neighbor cell list of the UE 102, etc.), relative cost of employing one type of status modification relative to another type of status modification, type of data traffic associated with the base stations and UEs in the communication network, amount of fluctuation (e.g., volatility) in communication conditions associated with the UE 102 (e.g., due to the UE 102 moving from one location to another or moving to an area, such as inside a building, where cell coverage may be impeded), preferences associated with the UE 102, desired Quality of Service (QoS) for the UE 102, and/or other desired criteria. Information relating to one or more of the predefined status modification criteria can be evaluated and the criteria applied to such information in order to determine whether a status modification is to occur with regard to a base station(s) associated with the UE 102, what type of status modification (if any) is to be applied with regard to a base station(s) associated with the UE 102; whether re-evaluation relating to status modification is to occur (e.g., be triggered), etc.

The subject innovation, by modifying status of a base station(s) and its link(s) with a UE 102 in accordance with predefined status modification criteria, can thereby facilitate releasing and/or maintaining desired backhaul capacity (e.g., Iub capacity) associated with base stations in the communication network, where such available backhaul capacity can be utilized for other desired purposes (e.g., data communications with other communication devices). As a result, the subject innovation can improve availability of backhaul capacity and facilitate improved communication in the communication network, as compared to conventional communication systems and techniques. Further, with regard to transitioning a base station from an active set to a monitored set associated with a UE 102 in accordance with the predefined status modification criteria, the subject innovation can facilitate improved communication in the network as more code (e.g., code 3) can be available to other data traffic and/or other types of data traffic associated with the base station (as compared to the amount of code that would be available when the base station is still on the active set), although there may be a cost due to additional signaling relating to transitioning a base station from active set to monitored set when compared with having the base station cease data transmissions with the UE 102 but keeping the base station on the active set.

It is to be appreciated and understood that the subject innovation is depicted in FIG. 1 as having one UE 102; three base stations 104, 106 and 108; one RNC 110; one core network 112; and one link controller component 114; however, the subject innovation is not so limited, as there also can be more than one UE; less than three or more than three base stations; more than one RNC; more than one core network; and/or more than one link controller component—as desired. It is to be further appreciated and understood that, while the link controller component 114 is depicted as being in the RNC 110, the subject innovation is not so limited, as, in accordance with various other embodiments, the link controller component 114 can be a stand-alone unit, or can be part of another component in system 100, or portions (e.g., components) of the link controller component 114 can be distributed as separate components throughout the system 100, as desired.

In accordance with an embodiment of the subject innovation, one or more components (e.g., UE 102, base stations 104, 106 and/or 108, RNC 110, core network 112, link controller component 114, etc.) in the communication network can utilize artificial intelligence (AI) techniques or methods to infer (e.g., reason and draw a conclusion based at least in part on a set of metrics, arguments, or known outcomes in controlled scenarios) whether status (e.g., communication status, active set status, link status, etc.) of a base station(s) associated with a UE is to be modified; whether a radio link between a base station and a UE has a sufficiently high in radio link quality such that status is to be modified for another base station that is associated with the UE and has the heaviest backhaul load relative to other base stations associated with the UE; whether more than one base station is to have their status modified with respect to a UE; whether to dynamically trigger re-evaluation of conditions associated with the UE and associated base stations to facilitate determining whether status modification is to occur with respect to a base station; etc. Artificial intelligence techniques typically can apply advanced mathematical algorithms—e.g., decision trees, neural networks, regression analysis, principal component analysis (PCA) for feature and pattern extraction, cluster analysis, genetic algorithm, and reinforced learning—to historic and/or current data associated with system 100 (or another system(s) or method(s) disclosed herein) to facilitate rendering an inference(s) related to the system 100 (or another system(s) or method(s) disclosed herein).

In particular, the one or more components in the network can employ one of numerous methodologies for learning from data and then drawing inferences from the models so constructed, e.g., Hidden Markov Models (HMMs) and related prototypical dependency models. General probabilistic graphical models, such as Dempster-Shafer networks and Bayesian networks like those created by structure search using a Bayesian model score or approximation can also be utilized. In addition, linear classifiers, such as support vector machines (SVMs), non-linear classifiers like methods referred to as "neural network" methodologies, fuzzy logic methodologies can also be employed. Moreover, game theoretic models (e.g., game trees, game matrices, pure and mixed strategies, utility algorithms, Nash equilibria, evolutionary game theory, etc.) and other approaches that perform data fusion, etc., can be exploited in accordance with implementing various automated aspects described herein. The foregoing methods can be applied to analysis of the historic and/or current data associated with system 100 (or another system(s) disclosed herein) to facilitate making inferences or determinations related to system 100 (or another system(s) disclosed herein).

In accordance with various aspects and embodiments, the subject innovation can be utilized in wireless and/or wired communication networks. For instance, the subject innovation can be employed in virtually any communication network where more than one component can be communicating with a communication device at the same or substantially the same time and such components also are subjected to respective load levels on respective links with a controller component due to communications with communication devices. For example, the subject innovation can be employed in wireless networks, such as wireless networks that employ soft handover of communication devices (e.g., UE 102), with such networks including, for example, Third Generation (3G) type networks, Fourth Generation (4G) type networks, Universal Mobile Telecommunications Systems (UMTS), Code Division Multiple Access (CDMA) type systems, Wideband CDMA (WCDMA) type systems, etc.

Figure 2:
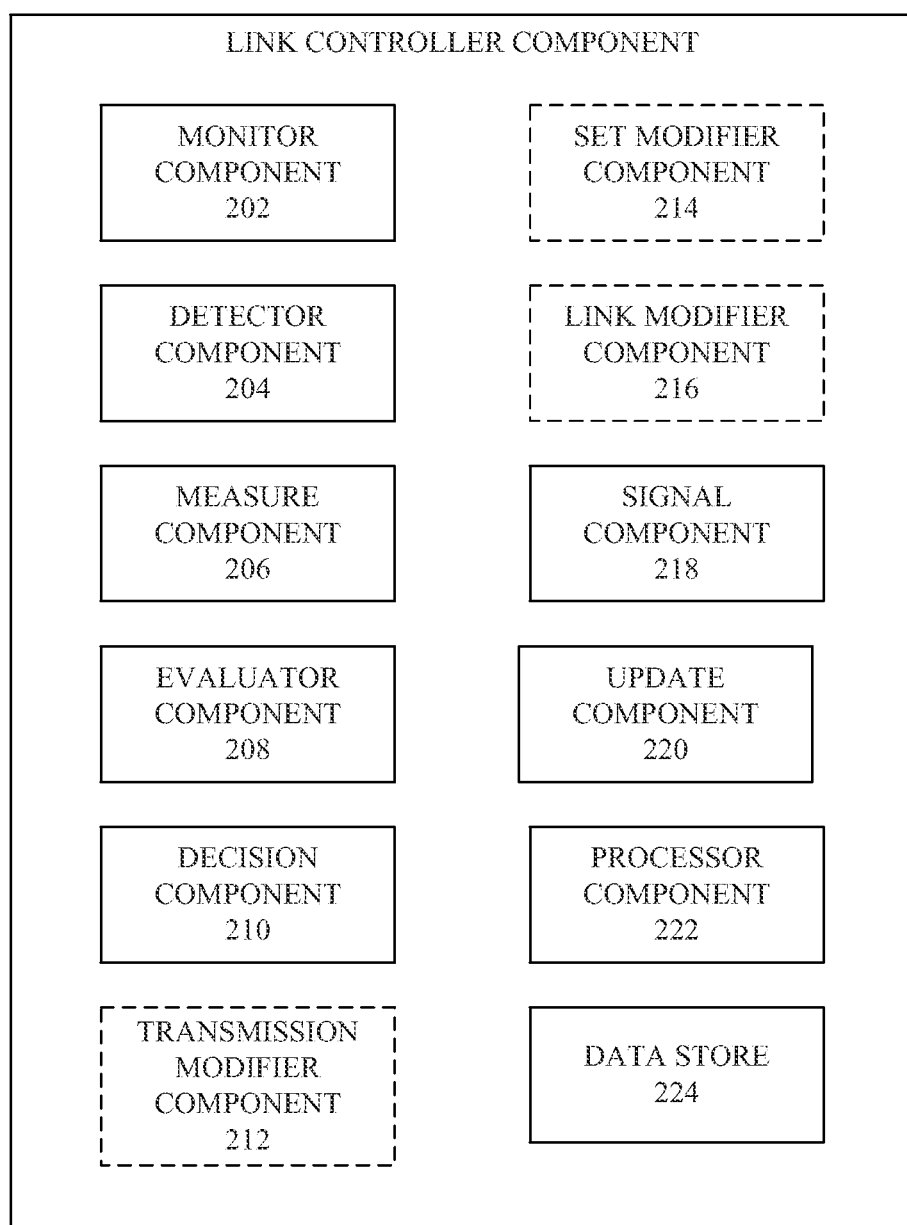
FIG. 2 depicts a block diagram of an example link controller component in accordance with an embodiment of the disclosed subject matter.

FIG. 2 depicts a block diagram of an example link controller component 200 in accordance with an embodiment of the disclosed subject matter. In an aspect, the link controller component 200 can be associated with an RNC (e.g., contained within or connected to an RNC) and can be utilized to control status (e.g., communication status, active set status, link status, etc.) of base stations (e.g., 104, 106, 108) with respect to a UE (e.g., 102), for example, during soft handover of the UE. In an aspect, the link controller component 200 can include a monitor component 202 that can monitor communication conditions associated with UEs and base stations that are associated with the RNC. For example, the monitor component 202 can monitor respective radio link conditions (e.g., quality of radio link) between a UE and respective base stations that have a link with the UE (e.g., base stations that are part of the active set associated with the UE) and respective backhaul load conditions of base stations associated with the RNC.

In another aspect, the link controller component 200 also can include a detector component 204 that can detect or receive information (e.g., feedback) relating to conditions associated with UEs and base stations that are associated with the RNC. For example, the detector component 204 can detect or receive feedback information relating to respective radio link conditions between a UE and respective base stations that have a radio link with the UE (e.g., event messages indicating a change with regard to which base station has the highest radio link quality with a UE; and/or information or messages indicating respective radio link quality values of respective base stations associated with a UE; etc.) and feedback information relating to respective backhaul load conditions (e.g., backhaul load levels) of base stations associated with the RNC.

In still another aspect, the link controller component 200 can include a measure component 206 that can measure parameter values and/or receive measurements of parameter values (e.g., value of radio link between UE and base station, value of backhaul load level of a backhaul link between a base station and the RNC, etc.) and/or other information relating to the communication conditions associated with UEs and base stations associated with the RNC, and backhaul load levels respectively associated with the base stations. The link controller component 200 also can contain an evaluator component 208 that can analyze and/or evaluate information (e.g., event messages that can be indicative of status or level of radio link quality) and measured parameter values obtained as a result of the monitoring of communication conditions associated with the UEs and base stations in accordance with the predefined status modification criteria, as disclosed herein. For example, the evaluator component 208 can evaluate the detected or received information and measured parameter values to facilitate determining whether a base station associated with a UE during soft handover of the UE has a highest radio link quality with the UE, whether a highest radio link quality meets or exceeds a predefined minimum acceptable link quality threshold level, whether the base station having the highest radio link quality with the UE also has the heaviest backhaul load level with regard to its backhaul link with the RNC (e.g., Iub link) relative to respective backhaul load levels of other base stations associated with the UE, etc.

In still another aspect, the link controller component 200 can comprise a decision component 210 that can operate in conjunction with the evaluator component 208 to make or render decisions relating to whether there is to be a modification of status of a base station(s) associated with a UE during soft handover, in accordance with the predefined status modification criteria. For instance, the decision component 210 can apply one or more predefined status modification rules, which are based at least in part on the predefined status modification criteria or conditions, to the results of the evaluation of the detected or received information and measured parameter values to decide or determine whether a base station associated with a UE during soft handover of the UE has a highest radio link quality with the UE, whether a highest radio link quality meets or exceeds a predefined minimum acceptable link quality threshold level, whether the base station having the highest radio link quality with the UE also has the heaviest backhaul load level relative to respective backhaul load levels of other base stations associated with the UE, etc. The decision component 210 also can determine which action (e.g., status modification) to take when the predefined status modification conditions are satisfied.

For example, during soft handover, the decision component 210 can determine that a base station associated with a UE has the highest radio link quality with the UE as compared to other base stations associated with the UE, determine that the highest radio link quality meets or exceeds the predefined minimum acceptable link quality threshold level for status modification, and determine that another base station associated with the UE (and not the base station having the highest radio link quality with the UE) has the heaviest backhaul load level relative to base stations associated with the UE. Based at least in part on the above determinations of this example, the decision component 210 can determine that the base station having the heaviest backhaul load level is to have its status modified with respect to the UE as follows: (1) such base station is to cease or discontinue transmitting data to the UE for a predefined period of time or until a predefined status modification condition is met, where, for example, the link controller component 200 can facilitate having the base station ceasing to transmit data to the UE by not distributing data associated with the UE to that base station for the desired amount of time; (2) such base station is to transition from the active set to the monitored set associated with the UE for a predefined period of time or until a predefined status modification condition is met (as well as discontinuing data transmission to the UE); or (3) such base station is to be dynamically redefined such that the radio link between that base station and the UE is removed for a predefined period of time or until a predefined status modification condition is met (as well as discontinuing transmission to the UE and transitioning from the active set associated with the UE), where, for example, the link controller component 200 can send a signal to the UE to remove the base station from its neighbor cell list.

In accordance with various embodiments, the link controller component 200 can include (optionally) one or more of a transmission modifier component 212, a set modifier component 214, and/or a link modifier component 216. When employed, the transmission modifier component 212 can operate in conjunction with the decision component 210 to modify transmission status of a desired base station (e.g., base station having the heaviest relative backhaul load level and not having the highest radio link quality with the UE) to have the base station cease data transmissions with the UE. For instance, the transmission modifier component 212 can facilitate modifying distribution of data associated with the UE to the base station(s) that is/are part of the active set of the UE, so that no data associated with the UE is distributed to the base station having its status modified to cease data transmission for the desired amount of time, and thus, that base station will not have any data to distribute to the UE. When employed, the set modifier component 214 can operate in conjunction with the decision component 210 to modify set status of the desired base station to transition the base station from the active set to the monitored set associated with the UE. When employed, the link modifier component 216 can operate in conjunction with the decision component 210 to modify link status of a desired base station by redefining the desired base station such that the link is removed between the UE and the desired base station and the neighbor cell list of the UE is updated to remove the desired base station from the neighbor cell list, for a desired amount of time. For instance, the link modifier component 216 can facilitate communicating a signal to the UE to update its neighbor cell list to remove the desired base station from the list and also discontinue the radio link with that base station.

In another aspect, the link controller component 200 can include a signal component 218 that can send one or more specified control signals (e.g., signal to transition from active set to monitored set, signal to redefine the base station to have the UE remove that base station from the neighbor cell list of a UE and remove the radio link with the UE, signal transmitted to the UE to notify the UE that a base station is being transitioned from the active set to the monitored set, etc.) to a UE or a base station(s) to facilitate modifying status of that base station(s) with respect to a UE during soft handover. For example, the signal component 218 can receive an indication (e.g., via an indicator or other signal) from the decision component 210 that a particular base station (e.g., base station having heaviest backhaul load) is to have its status modified and/or an indication of the type of status modification that is to occur with respect to the particular base station. The signal component 218 can generate and transmit the desired control signal to the UE and/or particular base station in accordance with the indicators received from the decision component 210.

In still another aspect, the link controller component 200 can contain an update component 220 that can transmit an update, such as a neighbor cell update message, to a UE (e.g., 102) to facilitate having the UE update its neighbor cell list, for example, to remove a base station from the neighbor cell list for a desired amount of time when that base station has its status modified with respect to the UE in accordance with the predefined status modification criteria. The update component 220 also can send an update to a UE to facilitate adding or removing a base station to/from a neighbor cell list of a UE for other desired reasons.

In yet another aspect, the link controller component 200 can comprise a processor component 222 that can work in conjunction with the other components (e.g., monitor component 202, detector component 204, measure component 206, evaluator component 208, decision component 210, (optional) transmission modifier component 212, (optional) set modifier component 214, (optional) link modifier component 216, signal component 218, update component 220, etc.) to facilitate performing the various functions of the link controller component 200. The processor component 222 can employ one or more processors, microprocessors, or controllers that can process data, such as information relating to respective backhaul load levels of base stations associated with the RNC and communication conditions between UEs and base stations, predefined status modification rules, monitoring or detecting feedback information (e.g., event messages relating to a change with regard to the base station have the highest radio link quality with respect to the UE; and/or parameter values relating to communication conditions associated with the UE; etc.) from UEs or base stations, measuring parameters associated with respective backhaul load levels of base stations or communication conditions (e.g., radio link quality) between UEs and base stations, evaluating information obtained in relation to monitoring or detection of feedback information and/or measured parameters, decisions regarding status modification of a base station(s), control signals relating to status modification of a base station(s), update messages, etc., to facilitate controlling respective status of base stations associated with a UE(s) based at least in part on the predefined status modification criteria; and can control data flow between the link controller component 200 and other components (e.g., UEs, base stations, other communication devices, core network, etc.) associated with the link controller component 200.

The link controller component 200 also can include a data store 224 that can store data structures (e.g., user data, metadata); code structure(s) (e.g., modules, objects, classes, procedures) or instructions; information relating to respective backhaul load levels of base stations associated with the RNC and communication conditions between UEs and base stations, predefined status modification rules, monitoring or detecting feedback information from UEs or base stations, measuring parameters associated with respective backhaul load levels of base stations or communication conditions between UEs and base stations, evaluating information obtained in relation to monitoring or detection of feedback information and/or measured parameters, decisions regarding status modification of a base station(s), control signals relating to status modification for a base station(s), update messages regarding neighbor cell lists, etc., to facilitate controlling respective status of base stations associated with a UE(s) based at least in part on the predefined status modification criteria, etc.; routing information; the predefined service criteria and associated rules; network or device information like policies and specifications, paging protocols; code sequences for scrambling; cell IDs; and so on. In an aspect, the processor component 222 can be functionally coupled (e.g., through a memory bus) to the data store 224 in order to store and retrieve information desired to operate and/or confer functionality, at least in part, to the monitor component 202, detector component 204, measure component 206, evaluator component 208, decision component 210, (optional) transmission modifier component 212, (optional) set modifier component 214, (optional) link modifier component 216, signal component 218, update component 220, and/or substantially any other operational aspects of the link controller component 200.

Figure 3:
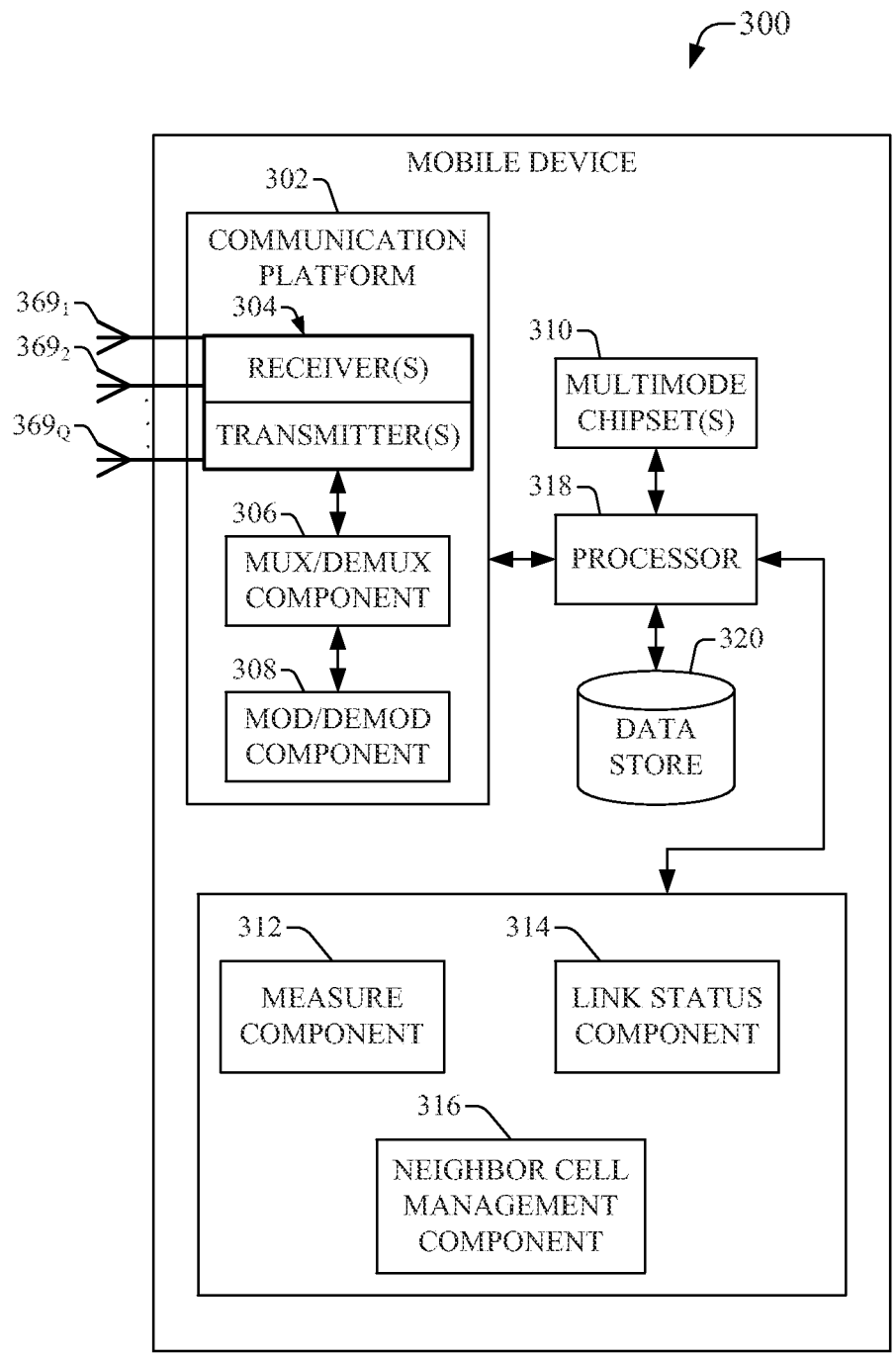
FIG. 3 depicts a block diagram of an example mobile device in accordance with an aspect of the disclosed subject matter.

FIG. 3 depicts a block diagram of an example mobile device 300 (e.g., UE) in accordance with an aspect of the disclosed subject matter. In an aspect, the mobile device 300 can be a multimode access terminal, wherein a set of antennas $369_1$-$369_Q$ (Q is a positive integer) can receive and transmit signal(s) from and to wireless devices like access points, access terminals, wireless ports and routers, and so forth, that operate in a radio access network. It should be appreciated that antennas $369_1$-$369_Q$ are a part of communication platform 302, which comprises electronic components and associated circuitry that provide for processing and manipulation of received signal(s) and signal(s) to be transmitted; e.g., receivers and transmitters 304, multiplexer/demultiplexer (mux/demux) component 306, and modulation/demodulation (mod/demod) component 308.

In another aspect, the mobile device 300 can include a multimode operation chipset(s) 310 that can allow the mobile device 300 to operate in multiple communication modes in accordance with disparate technical specification for wireless technologies. In an aspect, multimode operation chipset(s) 310 can utilize communication platform 302 in accordance with a specific mode of operation (e.g., voice, GPS). In another aspect, multimode operation chipset(s) 310 can be scheduled to operate concurrently (e.g., when Q>1) in various modes or within a multitask paradigm.

In still another aspect, the mobile device 300 can comprise a measure component 312 that can measure respective radio link levels between the mobile device 300 and base stations, such as base stations on the neighbor cell list of the mobile device 300, at desired times (e.g., periodically). In accordance with various embodiments, the mobile device 300 can contain a link status component 314 that can operate in conjunction with the measure component 312 and can facilitate communicating messages (e.g., event messages) relating to link status of the UE with respect to one or more base stations on the neighbor cell list and/or respective measured radio link quality levels or values relating to respective base stations to the link controller component (e.g., 114), where such information can be utilized in making determinations relating to status modifications of base stations. For example, the link status component 314 can communicate one type of event message to the link controller component when a base station associated with the active set of the mobile device 300 becomes the base station having the highest radio link quality with respect to the mobile device 300, as compared to the base station that is part of the active set and previously had the highest radio link quality with respect to the mobile device 300; and/or communicate another type of event message to the link controller component when a base station that is not part of the active set (e.g., a base station that is part of the monitored set associated with the mobile device 300) becomes the base station having the highest radio link quality with respect to the mobile device 300.

In yet another aspect, the mobile device 300 can include a neighbor cell management component 316 that can be employed to maintain and update a neighbor cell list, which can contain information relating to the base stations neighboring the mobile device 300. One aspect relating to the neighbor cell list is that the measure component 312 can measure the radio link levels of base stations that are on the neighbor cell list to facilitate determining which base station has the highest radio link quality. In another aspect, the neighbor cell management component 316 can update the neighbor cell list of the mobile device 300 to remove a base station from the neighbor cell list, for example, when the mobile device 300 moves out of an area covered by that base station, or when that base station has its status modified such that the mobile device 300 removes or discontinues its radio link with that base station in accordance with the predefined status modification criteria. The measure component 312 can recognize that such base station is no longer on the neighbor cell list and will not attempt to measure the radio link quality between the mobile device 300 and that base station. The mobile device 300 can receive information from the RNC (e.g., 110) relating to the base stations that are to be on the neighbor cell list, and the neighbor cell management component 316 can maintain and update the neighbor cell list based at least in part on the received information.

In still another aspect, the mobile device 300 also can include a processor(s) 318 that can be configured to confer functionality, at least in part, to substantially any electronic component within the mobile device 300, in accordance with aspects of the subject innovation. For example, the processor(s) 318 can facilitate enabling the mobile device 300 to process data (e.g., symbols, bits, or chips) for multiplexing/demultiplexing, modulation/demodulation, such as implementing direct and inverse fast Fourier transforms, selection of modulation rates, selection of data packet formats, inter-packet times, etc. As another example, the processor(s) 318 can facilitate enabling the mobile device 300 to process data relating to measuring respective radio link qualities between the mobile device 300 and respective base stations, communicating event messages relating to radio link status (e.g., change in radio link having highest radio link quality) and/or radio link measurements to the RNC and/or link controller component, managing, maintaining and updating a neighbor cell list, etc.

The mobile device 300 also can contain a data store 320 that can store data structures (e.g., user data, metadata); code structure(s) (e.g., modules, objects, classes, procedures) or instructions; neighbor cell list; information relating to measuring respective radio link qualities between the mobile device 300 and respective base stations; information relating to communicating event messages relating to radio link status (e.g., change in radio link having highest radio link quality) and/or measured radio link qualities to the RNC and/or link controller component; information that facilitates managing, maintaining, or updating the neighbor cell list; network or device information like policies and specifications; attachment protocols; code sequences for scrambling, spreading and pilot (e.g., reference signal(s)) transmission; frequency offsets; cell IDs; encoding algorithms; compression algorithms; decoding algorithms; decompression algorithms; and so on. In an aspect, the processor(s) 318 can be functionally coupled (e.g., through a memory bus) to the data store 320 in order to store and retrieve information (e.g., neighbor cell list, information relating to measuring radio link levels, frequency offsets, desired algorithms, etc.) desired to operate and/or confer functionality, at least in part, to communication platform 302, multimode operation chipset(s) 310, measure component 312, link status component 314, neighbor cell management component 318, and/or substantially any other operational aspects of the mobile device 300.

Figure 4:
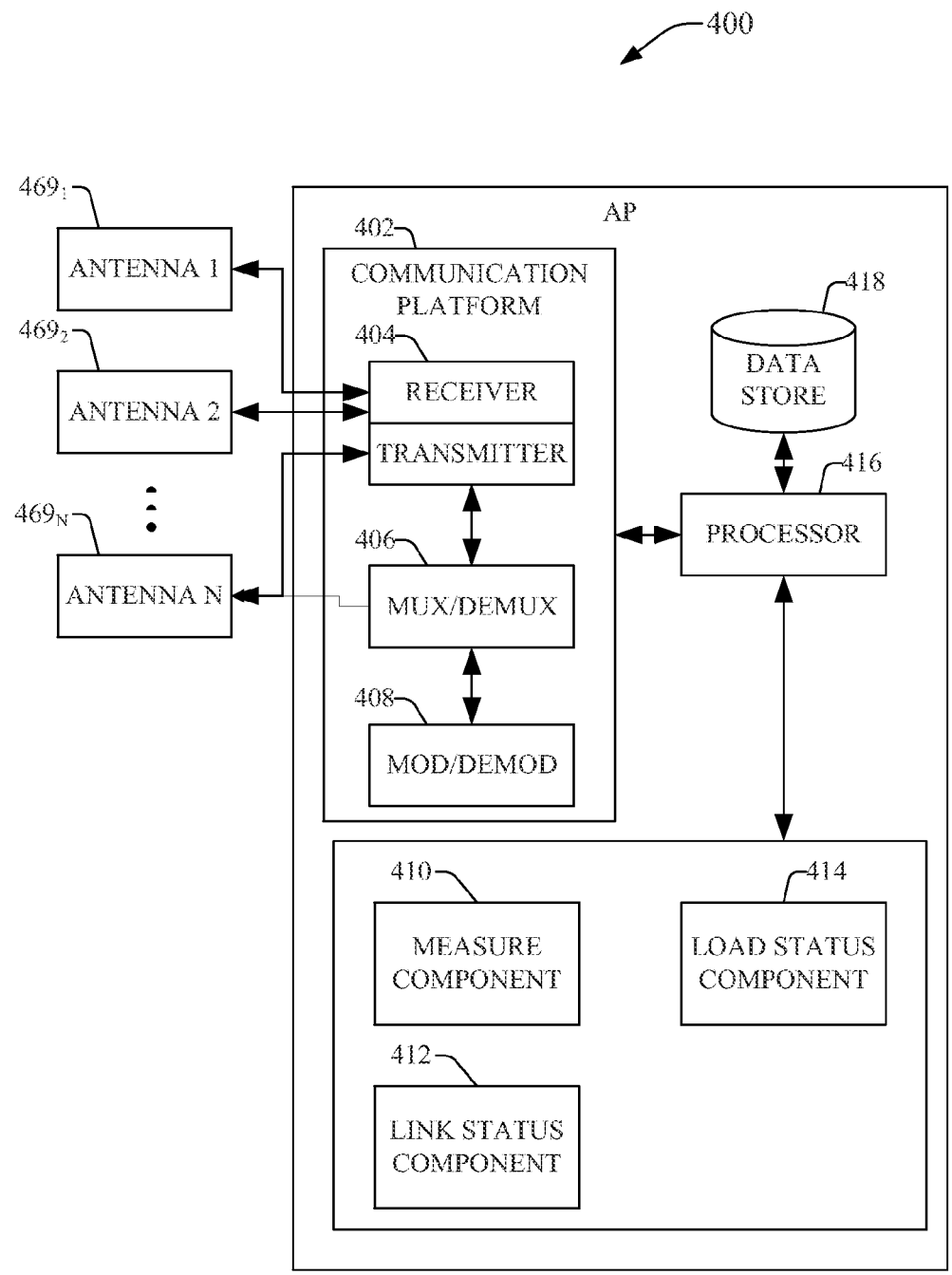
FIG. 4 illustrates a block diagram of an example access point (AP) in accordance with an aspect of the disclosed subject matter.

FIG. 4 illustrates a block diagram of an example AP 400 (e.g., base station) in accordance with an aspect of the disclosed subject matter. The AP 400 can receive and transmit signal(s) from and to wireless devices like access points (e.g., base stations, femto APs, pico APs), access terminals (e.g., UEs), wireless ports and routers, and the like, through a set of antennas $469_1$-$469_N$. In an aspect, the antennas $469_1$-$469_N$ are a part of a communication platform 402, which comprises electronic components and associated circuitry that can provide for processing and manipulation of received signal(s) and signal(s) to be transmitted. In an aspect, the communication platform 402 can include a receiver/transmitter 404 that can convert signal from analog to digital upon reception, and from digital to analog upon transmission. In addition, receiver/transmitter 404 can divide a single data stream into multiple, parallel data streams, or perform the reciprocal operation.

In an aspect, coupled to receiver/transmitter 404 can be a multiplexer/demultiplexer (mux/demux) 406 that can facilitate manipulation of signal in time and frequency space. The mux/demux 406 can multiplex information (e.g., data/traffic and control/signaling) according to various multiplexing schemes such as, for example, time division multiplexing (TDM), frequency division multiplexing (FDM), orthogonal frequency division multiplexing (OFDM), code division multiplexing (CDM), space division multiplexing (SDM), etc. In addition, mux/demux component 406 can scramble and spread information (e.g., codes) according to substantially any code known in the art, e.g., Hadamard-Walsh codes, Baker codes, Kasami codes, polyphase codes, and so on. A modulator/demodulator (mod/demod) 408 also can be part of the communication platform 402, and can modulate information according to multiple modulation techniques, such as frequency modulation, amplitude modulation (e.g., M-ary quadrature amplitude modulation (QAM), with M a positive integer), phase-shift keying (PSK), and the like.

In an aspect, the AP 400 can include a measure component 410 that can measure or receive information relating to measurement of a radio link quality(ies) between the AP 400 and a UE(s) (e.g., 102) at desired times (e.g., periodically). In another aspect, the measure component 410 can measure the backhaul load level of the backhaul link (e.g., Iub link) between the AP 400 and the RNC (e.g., 110) at desired times (e.g., periodically). In still another aspect, the AP 400 can include a link status component 412 that can operate in conjunction with the measure component 410 to obtain the measured radio link quality between the AP 400 and the UE(s), for each UE associated with the AP 400, and, in accordance with an embodiment, can facilitate communicating the measured radio link quality(s) to the RNC (e.g., 110) and/or link controller component (e.g., 114) and/or, in accordance with another embodiment, can facilitate communicating event status messages relating to radio link status (e.g., event messages relating to a change in the radio link having the highest radio link quality). The AP 400 also can comprise a load status component 414 that can operate in conjunction with the measure component 410 to obtain the measured backhaul load level of the backhaul link between the AP 400 and the RNC at given times and can facilitate communicating the measured backhaul load level to the RNC (e.g., 110) and/or link controller component. The link controller component can utilize the information relating to radio link quality (e.g., event messages, and/or radio link quality measurements, etc.) and backhaul load levels associated with the AP 400 to facilitate making determinations regarding status modifications for the AP 400 or other APs.

The AP 400 also can comprise a processor(s) 416 that can be configured to confer and/or facilitate providing functionality, at least partially, to substantially any electronic component in or associated with the AP 400. For instance, the processor(s) 416 can facilitate operations on data (e.g., symbols, bits, or chips) for multiplexing/demultiplexing, modulation/demodulation, such as effecting direct and inverse fast Fourier transforms, selection of modulation rates, selection of data packet formats, inter-packet times, etc. The processor(s) 416 also can facilitate other operations on data for measurement of radio link quality or reception of information related thereto, measurement of backhaul load level, provision of information relating to radio link quality and backhaul load levels, etc.

In another aspect, the AP 400 can include a data store 418 that can store data structures; code instructions; rate coding information; information relating to measurement of radio link quality or reception of information related thereto; information relating to measurement of backhaul load level of the AP 400; information relating to provision of information relating to radio link quality and backhaul load levels associated with the AP 400; system or device information like policies and specifications; code sequences for scrambling; spreading and pilot transmission; floor plan configuration; access point deployment and frequency plans; scheduling policies; and so on. The processor(s) 416 can be coupled to the data store 418 in order to store and retrieve information (e.g., information, such as algorithms, relating to multiplexing/demultiplexing or modulation/demodulation, information relating to radio link levels or load levels, information relating to modification of mode or status of the AP 400 with respect to a UE(s), etc.) desired to operate and/or confer functionality to the communication platform 402, the measure component 410, the link status component 412, the load status component 414, and/or other operational components of AP 400.

In view of the example systems described herein, example methodologies that can be implemented in accordance with the disclosed subject matter can be better appreciated with reference to flowcharts in FIGS. 5-8. For purposes of simplicity of explanation, example methodologies disclosed herein are presented and described as a series of acts; however, it is to be understood and appreciated that the claimed subject matter is not limited by the order of acts, as some acts may occur in different orders and/or concurrently with other acts from that shown and described herein. For example, a methodology disclosed herein could alternatively be represented as a series of interrelated states or events, such as in a state diagram. Moreover, interaction diagram(s) may represent methodologies in accordance with the disclosed subject matter when disparate entities enact disparate portions of the methodologies. Furthermore, not all illustrated acts may be required to implement a methodology in accordance with the subject specification. It should be further appreciated that the methodologies disclosed throughout the subject specification are capable of being stored on an article of manufacture to facilitate transporting and transferring such methodologies to computers for execution by a processor or for storage in a memory.

Figure 5:
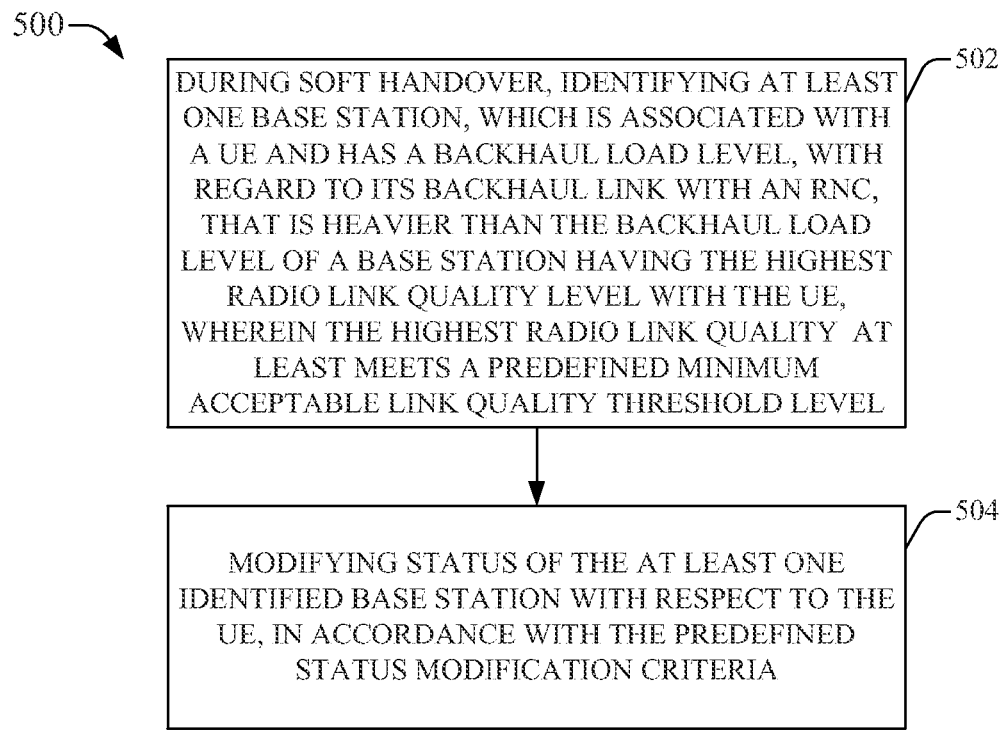
FIG. 5 illustrates a flowchart of an example methodology for controlling status of base stations associated a communication device during soft handover in accordance with various aspects of the disclosed subject matter.

FIG. 5 presents a flowchart of an example methodology 500 for controlling status of base stations associated a communication device (e.g., UE) during soft handover in accordance with various aspects of the disclosed subject matter. At 502, during soft handover, at least one base station, which is associated with a UE and has a backhaul load level, with regard to its link with the RNC, that is heavier (e.g., higher) than the backhaul load level of a base station having the highest radio link quality with the UE, can be identified, wherein the highest radio link quality at least meets a predefined minimum acceptable link quality threshold level.

At 504, status of the at least one identified base station with respect to the UE can be modified, in accordance with the predefined status modification criteria. For instance, an identified base station can have its status modified to (1) automatically or dynamically cease or discontinue transmitting data to the UE for a predefined period of time or until a predefined status modification condition is met, while remaining part of the active set associated with the UE (e.g., the RNC (or link controller component) can discontinue distributing data associated with the UE to the base station which is having its status modified, while continuing to distribute data to one or more other base stations supporting the data connection with the UE); (2) automatically or dynamically transition from the active set to the monitored set associated with the UE for a predefined period of time or until a predefined status modification condition is met (as well as discontinuing data transmission to the UE); or (3) automatically or dynamically be redefined such that the UE removes the radio link between the identified base station and the UE for a predefined period of time or until a predefined status modification condition is met (as well as discontinuing transmission to the UE and transitioning (e.g., at least initially) from the active set to the monitored set associated with the UE), where the neighbor cell list of the UE can be automatically or dynamically updated to remove the identified base station from the neighbor cell list (e.g., for a predefined period of time or until a predefined status modification condition is met).

Figure 6:
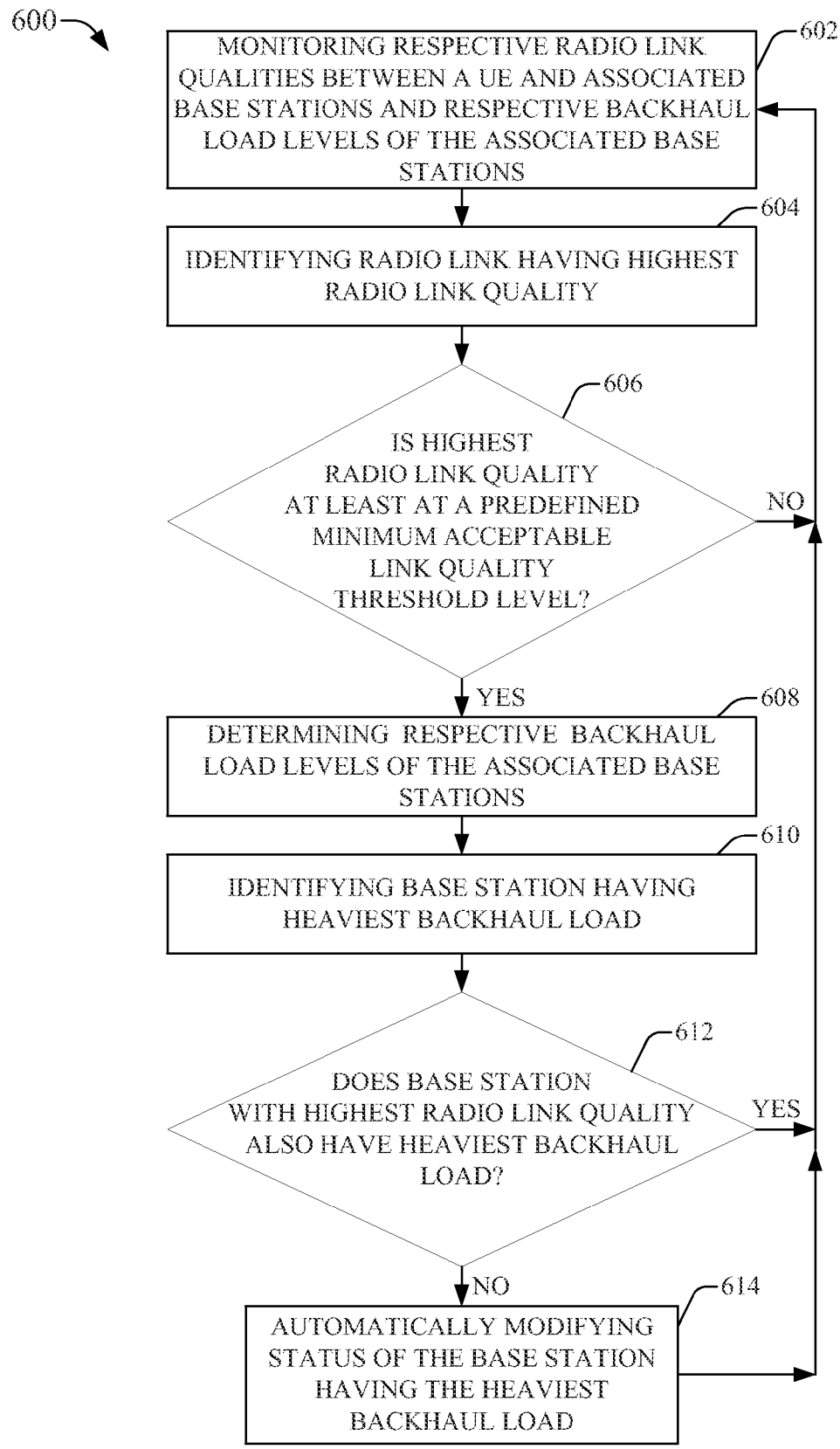
FIG. 6 depicts a flowchart of an example methodology for controlling status of base stations associated a communication device during soft handover in accordance with an aspect of the disclosed subject matter.

FIG. 6 depicts a flowchart of an example methodology 600 for controlling status of base stations associated a communication device (e.g., UE) during soft handover in accordance with an aspect of the disclosed subject matter. At 602, the radio link quality(ies) (e.g., quality level(s) or value(s)) of one or more respective radio links between a UE and associated base stations and respective backhaul load levels of the associated base stations (e.g., backhaul load levels of respective links between the base stations and the RNC) can be monitored. For example, the link controller component can monitor information relating communication conditions associated with the UE (e.g., event messages that can be indicative of radio link quality between the UE and respective associated base stations, and/or measured radio link quality between the UE and respective associated base stations) to facilitate identifying the radio link having the highest radio link quality. The link controller component also can monitor respective backhaul load levels of base stations associated with the UE.

At 604, the radio link associated with the UE having the highest radio link quality can be identified. In accordance with various embodiments, the link controller component (e.g., 114) can evaluate information relating to radio link quality (e.g., event messages relating to a change in the radio link having the highest radio link quality; and/or measured radio link quality value(s)) received from the UE to facilitate identifying the highest radio link quality associated with the UE. In an embodiment, for a given time period, the link controller component can evaluate an event message(s), if any, received from the UE, where a particular event message can, for example, indicate that there has been a change in the radio link having the highest radio link quality (e.g., a different radio link between the UE and a different base station now has the highest radio link quality). If no event message is received, the link controller component can determine or infer that the same radio link that had the highest radio link quality continues to have the highest radio link quality; if an event message is received, depending in part on the type of event message, the link controller component can determine that another radio link between the UE and another associated base station that is part of the active set now has the highest radio link quality, or determine that another radio link between the UE and a disparate associated base station that is not part of the active set (e.g., is part of the monitored set) now has the highest radio link quality associated with the UE.

In another aspect, in addition to any other action taken with regard to methodology 600, as disclosed herein, the RNC can respond to a received event message indicating a change in the link having the highest radio link quality by sending a respective signal to have the base station that has the radio link having the highest quality be the primary serving base station to the UE, have one or more base stations change from active set to monitored set (or change from monitored set to active set), take another desired action, or make no changes with regard to the active set of the UE, based at least in part on the type(s) of event message(s) received by the RNC and link controller component.

At 606, a determination can be made regarding whether the radio link between the UE and an associated base station having the highest radio link quality with the UE relative to other associated base stations at least meets a predefined minimum acceptable link quality threshold level. For instance, the link controller component (e.g., 114) can evaluate the highest radio quality and compare it to the predefined minimum acceptable link quality threshold level to determine whether the highest radio link quality meets or exceeds the predefined minimum acceptable link quality threshold level.

In an embodiment, the link controller component can evaluate the stability of the active set of the UE (e.g., how frequently or infrequently the active set changes for the UE), the frequency of receiving event messages from the UE, the types of event messages received from the UE, etc., over a desired (e.g., predefined) time period to facilitate determining or inferring a radio link quality value for the radio link identified as having the highest radio link quality at a given evaluation time, in accordance with the predefined status modification criteria. For example, a relatively stable active set (e.g., relatively little or no change as to which radio link has the highest quality, and/or relatively little or no change in the base stations that are part of the active set, etc.) associated with the UE for a given period of time can indicate to the link controller component that the radio link having the highest radio link quality is at least a certain value such that the highest radio link quality value at least meets the predefined minimum acceptable link quality threshold level. As another example, a relatively unstable active set (e.g., relatively significant amount of change regarding which radio link has the highest quality, and/or relatively significant amount of change regarding which base stations are part of the active set, etc.) associated with the UE for a given period of time can indicate to the link controller component that the radio link currently having the highest quality does not have a radio link quality value that at least meets the predefined minimum acceptable link quality threshold level.

In accordance with another embodiment, the RNC (and link controller component) can receive radio link quality measurements of respective radio links between the UE and associated base stations from the UE. The link controller component can evaluate the received radio link quality measurements to determine or identify which radio link has the highest radio link quality, and evaluate the radio link having the highest radio link quality to determine whether that radio link at least meets the predefined minimum acceptable link quality threshold level.

If it is determined that the base station having the highest radio link quality does not have a radio link quality value that at least meets the predefined minimum acceptable link quality threshold level, methodology 600 can determine that no action is to be taken with regard to the status of a base station(s) associated with the UE, and methodology 600 can return to reference numeral 602, where respective qualities (e.g., values) of radio links between a UE and associated base stations and respective backhaul load levels of the associated base stations can be monitored. If, at 606, it is determined that the base station, which has the highest radio link quality among base stations associated with the UE, has a radio link quality value that at least meets the predefined minimum acceptable link quality threshold level, at 608, the respective backhaul load levels of the base stations associated with the UE can be determined.

At 610, the base station associated with the UE that has the heaviest (e.g., highest) backhaul load relative to base stations associated with the UE can be identified. In an aspect, the link controller component can evaluate or compare the respective backhaul load levels of the associated base stations relative to each other to determine which base station has the heaviest or highest backhaul load level. At 612, a determination can be made regarding whether the base station having the highest radio link quality (which at least meets the predefined minimum acceptable link quality threshold level) among base stations associated with the UE also has the heaviest (e.g., highest) backhaul load level relative to the other base stations associated with the UE.

If it is determined that the base station having the highest radio link quality among base stations associated with the UE also is identified as having the heaviest backhaul load level relative to the other base stations associated with the UE, methodology 600 can determine that no action is to be taken with regard to the status of a base station(s) associated with the UE, and methodology 600 can return to reference numeral 602, where respective qualities (e.g., quality values) of radio links between a UE and associated base stations and respective backhaul load levels of the associated base stations can continue to be monitored.

If, at 612, it is determined that the base station having the highest radio link quality with the UE among base stations associated with the UE is different than the base station identified as having heaviest backhaul load level relative to the other base stations associated with the UE, at 614, the base station, which is identified as having the heaviest backhaul load level relative to the other base stations associated with the UE, can have its status modified with respect to the UE in accordance with the predefined status modification criteria. At this point, methodology 600 can return to reference numeral 602, where respective radio link qualities between a UE and associated base stations and respective backhaul load levels of the associated base stations can continue to be monitored.

For example, in accordance with various aspects and embodiments, and in accordance with the predefined status modification criteria, the base station having the heaviest backhaul load relative to the other base stations associated with the UE (and not having the highest radio link quality with the UE) can be have its status modified such that the base station: (1) automatically or dynamically ceases or discontinues transmitting data to the UE for a predefined period of time or until a predefined status modification condition is met, while remaining part of the active set associated with the UE 102 (e.g., the RNC (or link controller component) can discontinue distributing data associated with the UE to the base station which is having its status modified, while continuing to distribute data to one or more other base stations supporting the data connection with the UE); (2) can be automatically or dynamically transitioned from the active set to the monitored set associated with the UE for a predefined period of time or until a predefined status modification condition is met (as well as discontinuing data transmission to the UE); or (3) can be automatically or dynamically redefined such that the radio link between that base station and the UE is removed for a predefined period of time or until a predefined status modification condition is met (as well as discontinuing transmission to the UE and transitioning from the active set associated with the UE), wherein the neighbor cell list of the UE can be automatically or dynamically updated to remove that base station from the neighbor cell list for a predefined period of time or until a predefined status modification condition is met.

Figure 7:
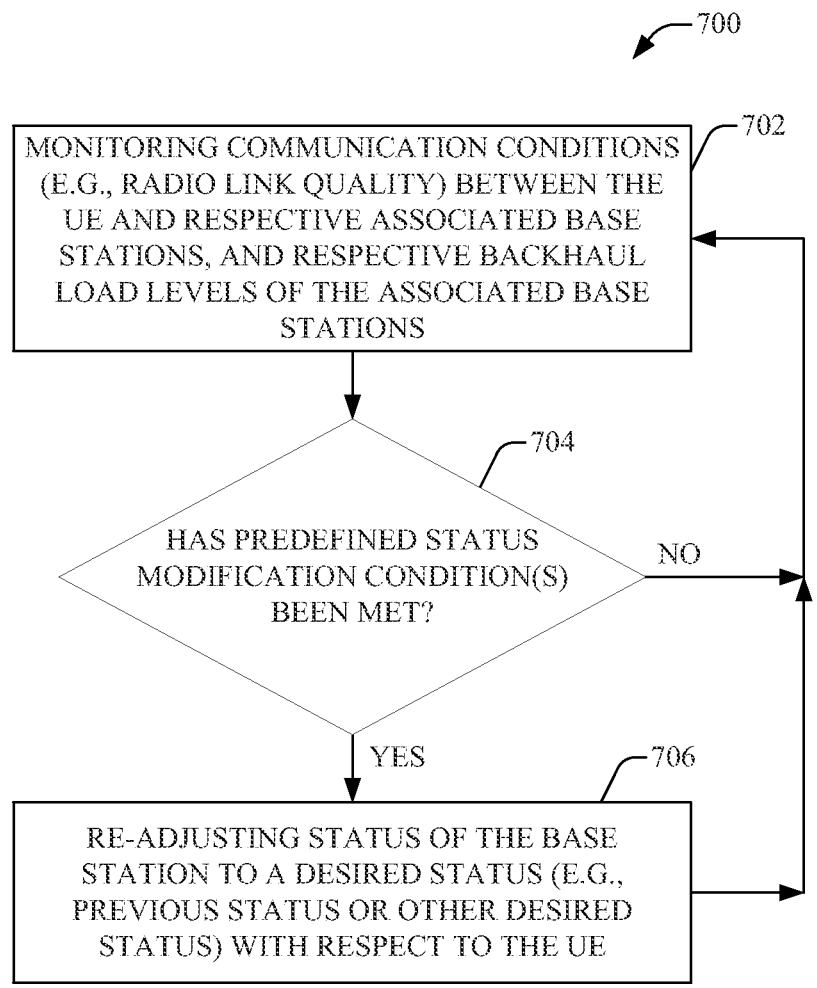
FIG. 7 illustrates a flowchart of an example methodology that can automatically or dynamically adjust (e.g., re-adjust) status of a base station with respect to a communication device during soft handover in accordance with an aspect of the disclosed subject matter.

FIG. 7 illustrates a flowchart of an example methodology 700 that can automatically or dynamically adjust (e.g., re-adjust) status of a base station with respect to a UE during soft handover in accordance with an aspect of the disclosed subject matter. For instance, methodology 700 can automatically or dynamically re-adjust status of a base station with respect to a UE, after the base station had previously had its status adjusted with respect to the UE, due in part to a predefined status modification condition being met. At 702, communication conditions (e.g., radio link quality) between the UE and respective associated base stations, and respective backhaul load levels of the associated base stations, can be monitored. At 704, a determination can be made regarding whether a predefined status modification condition(s) has been met. In an aspect, in accordance with the predefined status modification criteria, there can be one or more predefined status modification conditions, which, when any such condition is met, can trigger re-adjusting the status of a base station with respect to the UE, subsequent to the base station having its status adjusted with respect to the UE (e.g., subsequent to the base station having its status modified to cease communication with the UE, transition from active set to monitored set for the UE, or have its link with the UE removed or discontinued). Such conditions can include, for example, a condition that the status of the base station is to be re-adjusted back to its prior status (or another desired status) with respect to the UE when the highest radio link quality between the UE and the base station associated with the highest radio link quality decreases below a predefined minimum desired radio link quality threshold level (e.g., where the radio link quality can be determined or inferred by event messages relating to radio link quality associated with the UE and/or by received information relating to radio link quality measurements associated with the UE); a condition that the status of the base station is to be re-adjusted back to its prior status (or another desired status) with respect to the UE when a backhaul load level (e.g., Iub load level) of the base station associated with the highest radio link quality with the UE increases to meet or exceed a predefined maximum backhaul load threshold level; a condition that the status of the base station is to be re-adjusted back to its prior status (or another desired status) with respect to the UE when the radio link quality of that base station increases to a predefined radio link quality and/or increases such that the radio link quality becomes the highest radio link quality with respect to the UE, and/or when the backhaul load level of that base station decreases relative to the other base stations associated with the UE such that such base station no longer has the heaviest backhaul load level and/or its backhaul load level decreases to at or below a predefined backhaul load level; a condition that the status of the base station is to be re-adjusted back to its prior status (or another desired status) with respect to the UE when it is determined that the base stations associated with the UE (e.g., base stations on the neighbor cell list of the UE) are changing such that a predefined amount of change of base stations has occurred (e.g., due in part to the UE moving from one location to another location); and/or other desired conditions—in accordance with the predefined status modification criteria.

If, at 704, it is determined that a predefined status modification condition(s) has not been met, a determination that no action is to be taken can be made, and methodology 700 can return to reference numeral 702, where communication conditions between the UE and respective associated base stations, and respective load levels of the associated base stations, can continue to be monitored. Methodology 700 can continue from that point.

If, at 704, it is determined that an applicable predefined status modification condition(s) has been met, at 706, status of the base station can be re-adjusted to a desired status (e.g., previous status or other desired status) with respect to the UE. For example, if the base station previously had its status modified such that the base station has ceased data transmissions with the UE, and if an applicable predefined status modification condition(s) has been met, the status of the base station can be re-adjusted to have the base station again transmit data to the UE (e.g., the RNC or link controller component can again start distributing data to the UE via that base station (as well as other desired base stations during soft handover)). As another example, if the base station previously had its status modified such that the base station was transitioned from the active set to the monitored set associated with the UE (and ceased data transmissions with the UE), and if an applicable predefined status modification condition(s) has been met, the status of the base station can be re-adjusted to transition the base station back to the active set associated with the UE and/or have the base station again transmit data to the UE. At this point, methodology 700 can return to reference numeral 702, where communication conditions between the UE and respective associated base stations, and respective backhaul load levels of the associated base stations, can continue to be monitored, and methodology 700 can continue from that point. It is to be appreciated and understood that, when a re-adjustment of status occurs with respect to a base station that had its status previously adjusted, if desired, the status of another base station associated with the UE can have its status adjusted or no status adjustment will occur to another base station, in accordance with the predefined status modification criteria.

Figure 8:
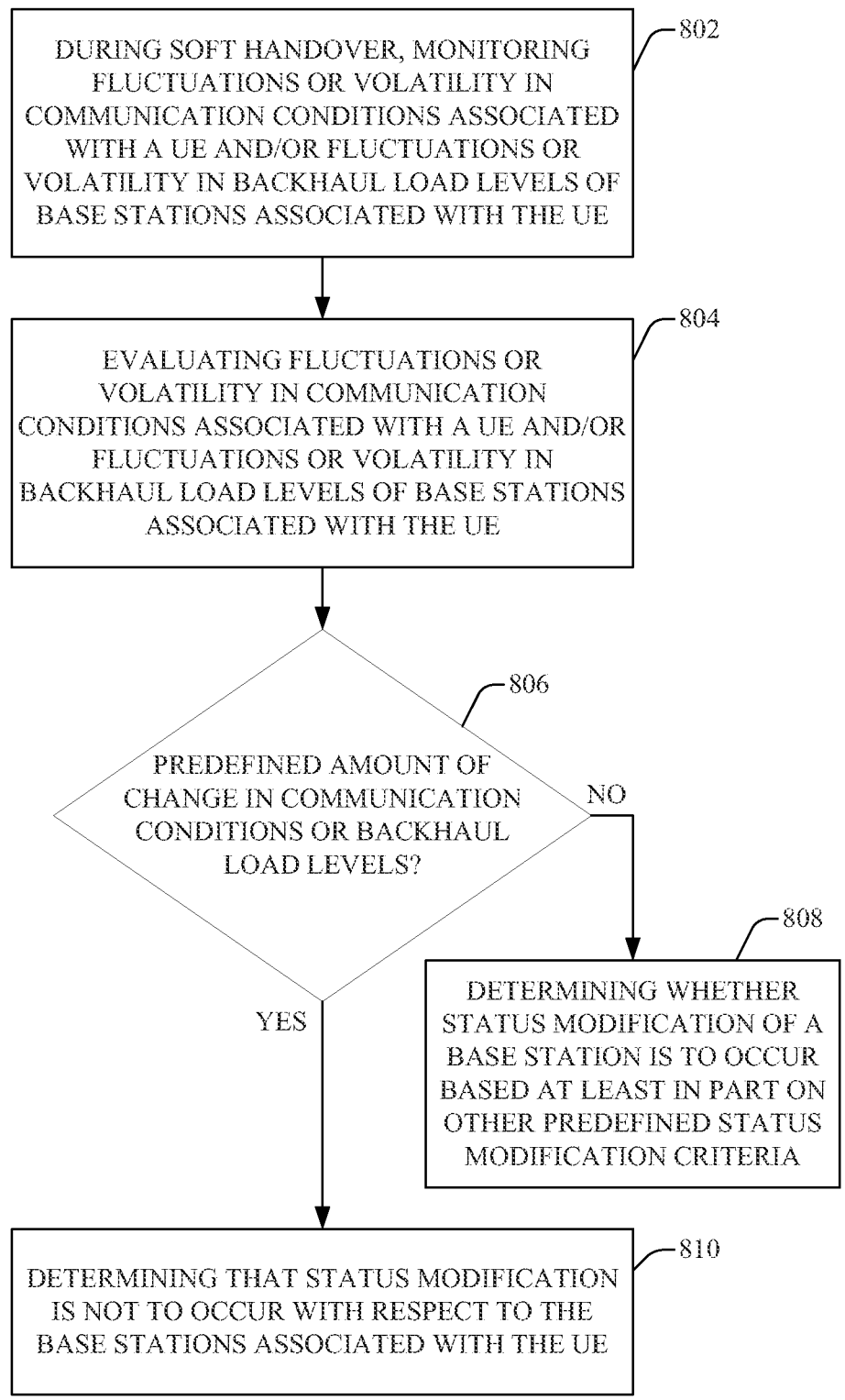
FIG. 8 illustrates a flowchart of an example methodology that can evaluate an amount of change in communication conditions associated with a communication device and amount of change in load levels of base stations associated with the communication device to facilitate determining whether a status modification it to occur with respect to a base station during soft handover in accordance with another aspect of the disclosed subject matter.

FIG. 8 illustrates a flowchart of an example methodology 800 that can evaluate an amount of change in communication conditions associated with a UE and amount of change in backhaul load levels (e.g., Iub load levels) of base stations associated with the UE to facilitate determining whether a status modification it to occur with respect to a base station during soft handover in accordance with another aspect of the disclosed subject matter. For instance, in certain instances, there can be fluctuations in the communication conditions (e.g., radio link quality) between the UE and associated base stations and/or load levels of the associated base stations, for example, due to the UE moving in the communication network and/or other factors, such as buildings or other structures, that can impact the communication conditions associated with the UE, fluctuations in respective backhaul load levels of respective base stations associated with the UE and/or overall backhaul load level of base stations associated with the RNC (and associated with the UE). Methodology 800 can facilitate reducing undesirable and/or inefficient status modifications with respect to base stations associated with a UE in part by taking into account the amount of fluctuation or volatility occurring with respect to communication conditions associated with the UE and/or with respect to backhaul load levels of associated base stations. For example, it can be undesirable to modify the status of a base station associated with the UE if the communication conditions of the UE are changing relatively quickly and/or backhaul load levels of associated base stations are changing relatively quickly, since such changes may result in an undue number of status modifications over a relatively short period of time, where such undue number of modifications can have an undesirable cost to the communication network (e.g., increased signaling relating to status modifications of base stations) that can outweigh the expected benefit of performing such status modifications over that short period of time.

At 802, during soft handover, fluctuations or volatility (e.g., changes) in communication conditions (e.g., quality of radio link) associated with the UE (e.g., 102) and/or fluctuations or volatility in backhaul load levels of base stations (e.g., 104, 106, and/or 108) associated with the UE can be monitored. At 804, the fluctuations or volatility in communication conditions associated with the UE and/or fluctuations or volatility in backhaul load levels of base stations associated with the UE can be evaluated, where, for example, the predefined status modification criteria (e.g., one or more predefined status modification rules based at least in part on the predefined status modification criteria) can be applied to the monitored information relating to fluctuations or volatility in communication conditions or backhaul load levels to facilitate determining whether to perform a status modification with respect to a base station associated with the UE.

At 806, a determination can be made regarding whether a predefined amount of change in communication conditions associated with the UE has occurred over a predefined period of time and/or a predefined amount of change in backhaul load levels of base stations associated with the UE has occurred over a specified period of time (where the predefined period of time can be the same as or different from the specified period of time, as desired). If it is determined that a predefined amount of change in communication conditions associated with the UE did not occur over the predefined period of time and/or a predefined amount of change in backhaul load levels of base stations (e.g., respective backhaul load levels of respective base stations or overall backhaul load level between the base stations and associated RNC) associated with the UE did not occur over the specified period of time, at 808, it can be determined whether status modification with respect to a base station associated with the UE is to occur in accordance with other predefined status modification criteria (e.g., by employing methodology 500 or methodology 600).

If, at 806, it is determined that a predefined amount of change in communication conditions associated with the UE has occurred over a predefined period of time and/or a predefined amount of change in backhaul load levels of base stations associated with the UE has occurred over a specified period of time, at 810, it can be determined that status modification is not to occur with respect to the base stations associated with the UE.

It is to be appreciated and understood that components (e.g., UE, base station(s), RNC, core network, link controller component, etc.), as described with regard to a particular system or methodology, can include the same or similar functionality as respective components (e.g., respectively named components) as described with regard to other systems or methodologies disclosed herein.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "data store," data storage," "database," and substantially any other information storage component relevant to operation and functionality of a component, refer to "memory components," or entities embodied in a "memory" or components comprising the memory. For example, information relevant to operation of various components described in the disclosed subject matter, and that can be stored in a memory, can comprise, but is not limited to comprising, subscriber information; cell configuration (e.g., devices served by an AP) or service policies and specifications; privacy policies; and so forth. It will be appreciated that the memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), phase change memory (PCM), flash memory, or nonvolatile RAM (e.g., ferroelectric RAM (FeRAM). Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD), Blu-ray disc (BD), . . . ), smart cards, and flash memory devices (e.g., card, stick, key drive . . . ).

What has been described above includes examples of systems and methods that provide advantages of the subject innovation. It is, of course, not possible to describe every conceivable combination of components or methodologies for purposes of describing the claimed subject matter, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A system, comprising:
a memory that stores computer-executable instructions; and
a processor, communicatively coupled to the memory, that facilitates execution of the computer-executable instructions to at least:
evaluate first data indicative of a first radio link quality of a communication of a first base station of a set of base stations with a communication device in association with a soft handover that involves the communication device;
evaluate second data indicative of a second radio link quality of a communication of a second base station of the set of base stations with the communication device in association with the soft handover, wherein the second data is contained in a received event message; and
based on a defined status modification criterion, modify a status of the first base station with respect to the communication device in response to a first determination that the second radio link quality satisfies a defined acceptable link quality threshold level and is higher than at least the first radio link quality, and in response to a second determination that the first base station has a backhaul load level, with regard to a first link between the first base station and a radio network controller, that satisfies a condition relative to other backhaul load levels of other base stations of the set of base stations not including the first base station.

2. The system of claim 1, wherein the processor further facilitates the execution of the computer-executable instructions to receive the event message comprising at least the second data that indicates the second radio link quality satisfies the defined acceptable link quality threshold level, and determine that the second radio link quality satisfies the defined acceptable link quality threshold level based on the event message.

3. The system of claim 2, wherein the processor further facilitates the execution of the computer-executable instructions to modify a status of the second base station with respect to the communication device from a monitored status associated with the communication device to an active status associated with the communication device in response to the event message.

4. The system of claim 1, wherein the processor further facilitates the execution of the computer-executable instructions to determine whether the second radio link quality satisfies the defined acceptable link quality threshold level based on a frequency of reception of event messages associated with the communication device.

5. The system of claim 1, wherein the processor further facilitates the execution of the computer-executable instructions to transmit a signal, to the first base station, that indicates the status of the first base station is to be modified with respect to the communication device, in accordance with the signal, to facilitate the modification of the status of the first base station with respect to the communication device.

6. The system of claim 1, wherein the processor further facilitates the execution of the computer-executable instructions to modify distribution of traffic to the communication device to cease transmission of at least a subset of the traffic associated with the communication device via the first link between the first base station and the radio network controller for a defined period of time in response to the modification of the status of the first base station with respect to the communication device.

7. The system of claim 1, wherein the defined status modification criterion relates to respective backhaul load levels associated with respective links between the base stations of the set of base stations and the radio network controller.

8. The system of claim 1, wherein the processor further facilitates the execution of the computer-executable instructions to communicatively connect the communication device with at least two base stations, including the second base station, of the set of base stations via respective radio links to establish the soft handover.

9. The system of claim 1, wherein the processor further facilitates the execution of the computer-executable instructions to monitor fluctuation in backhaul load levels associated with the base stations of the set of base stations over a defined period of time, and determine that modification of the status of a particular base station of the set of base stations is not to occur based on a determination that a defined amount of fluctuation has occurred with regard to the backhaul load levels associated with the base stations of the set of base stations over the defined period of time.

10. A method, comprising:
evaluating, by a system including a processor, radio link qualities of radio links of base stations with a mobile communication device, based on information contained in a received event message, in association with a soft handover of the mobile communication device, wherein the base stations comprise a first base station and a second base station, and the radio link qualities include a first radio link quality of a first radio link of the first base station with the mobile communication device and a second radio link quality of a second radio link of the second base station with the mobile communication device; and in accordance with a defined status modification criterion, facilitating modifying, by the system, a status of the first base station with respect to the mobile communication device in response to determining that the second radio link quality satisfies a defined acceptable link quality threshold level and is higher than at least the first radio link quality, and in response to determining that the first base station has a backhaul load level that satisfies a condition relative to other backhaul load levels of the base stations other than the first base station.

11. The method of claim 10, further comprising:

receiving, by the system, the event message that indicates the second radio link quality satisfies the defined acceptable link quality threshold level; and determining, by the system, that the second radio link quality satisfies the defined acceptable link quality threshold level based on the event message.

12. The method of claim 11, further comprising:

modifying, by the system, a status of the second base station with respect to the mobile communication device from a monitored status associated with the mobile communication device to an active status associated with the mobile communication device in response to the event message.

13. The method of claim 10, further comprising:

receiving, by the system, a subset of event messages associated with the mobile communication device, wherein the subset of event messages comprises the event message; and determining, by the system, whether the second radio link quality satisfies the defined acceptable link quality threshold level based on a frequency of receiving event messages associated with the mobile communication device.

14. The method of claim 10, further comprising:

transmitting, by the system, a signal, to the first base station, that indicates the status of the first base station is to be modified with respect to the mobile communication device, in accordance with the signal, to facilitate modifying the status of the first base station with respect to the mobile communication device.

15. The method of claim 10, further comprising:

modifying, by the system, distribution of traffic to the mobile communication device to cease transmission of at least a subset of the traffic associated with the mobile communication device via a communication link between the first base station and a radio network controller in response to the modifying of the status of the first base station with respect to the mobile communication device.

16. The method of claim 10, further comprising:

monitoring, by the system, a level of volatility in backhaul load levels associated with the base stations over a defined period of time;

determining, by the system, that a defined level of volatility has occurred with regard to the backhaul load levels associated with the base stations over the defined period of time; and determining, by the system, that modifying of the status of a particular base station of the base stations is not to occur in response to determining that the defined level of volatility has occurred with regard to the backhaul load levels associated with the base stations over the defined period of time.

17. A non-transitory computer-readable storage medium comprising computer-executable instructions that, in response to execution, cause a system including a processor to perform operations, comprising:

evaluating radio link qualities of base stations with a communication device, based on information contained in a received event message, in association with a soft handover, wherein the base stations comprise a first base station and a second base station and the radio link qualities include a first radio link quality of a first radio link of the first base station with the communication device and a second radio link quality of a second radio link of the second base station with the communication device; and in accordance with a defined status modification criterion, facilitating modifying a status of the first base station with respect to the communication device in response to determining that the second radio link quality satisfies a defined acceptable link quality threshold level and is higher than at least the first radio link quality, and in response to determining that the first base station has a backhaul load level that satisfies a condition relative to other backhaul load levels of the base stations other than the first base station.

18. The non-transitory computer-readable storage medium of claim 17, wherein the operations further comprise:

comparing the second radio link quality to a defined minimum acceptable link quality threshold level;

determining whether the second radio link quality satisfies the defined minimum acceptable link quality threshold level;

comparing respective backhaul load levels of the base stations to each other; and determining the first base station has a heaviest backhaul load level relative to the base stations other than the first base station and does not have a highest radio link quality relative to other radio link qualities of the base stations other than the first base station.

19. The non-transitory computer-readable storage medium of claim 17, wherein the operations further comprise:

modifying distribution of traffic to the communication device to cease transmission of at least a subset of the traffic associated with the communication device via a communication link between the first base station and a radio network controller for a defined period of time based on the modifying of the status of the first base station with respect to the communication device.

20. The non-transitory computer-readable storage medium of claim 17, wherein the operations further comprise:

receiving the event message comprising the information that indicates the second radio link quality satisfies the defined acceptable link quality threshold level; and determining that the second radio link quality satisfies the defined acceptable link quality threshold level based on the event message.

* * * * *